(12) United States Patent
Franzke et al.

(10) Patent No.: US 10,564,377 B2
(45) Date of Patent: Feb. 18, 2020

(54) PATCH BAY DEVICE, AND MODULAR SYSTEM FOR MAKING A PATCH BAY DEVICE

(71) Applicant: Reichle & De-Massari AG, Wetzikon (CH)

(72) Inventors: Joerg Franzke, Wetzikon (CH); Christian Lendi, Gossau (CH); Nadejda Zidarova, Sofia (BG); Nikola Dimitrov, Kardzhali (BG); Kaloyan Georgiev, Pleven (BG)

(73) Assignee: Reichle & De-Massari AG, Wetzikon (CH)

( * ) Notice: Subject to any disclaimer, the term of this patent is extended or adjusted under 35 U.S.C. 154(b) by 0 days.

(21) Appl. No.: 15/770,520

(22) PCT Filed: Oct. 20, 2016

(86) PCT No.: PCT/EP2016/075226
§ 371 (c)(1),
(2) Date: Apr. 24, 2018

(87) PCT Pub. No.: WO2017/072022
PCT Pub. Date: May 4, 2017

(65) Prior Publication Data
US 2019/0056560 A1    Feb. 21, 2019

(30) Foreign Application Priority Data
Oct. 27, 2015  (DE) .................. 10 2015 118 338

(51) Int. Cl.
*G02B 6/44*    (2006.01)

(52) U.S. Cl.
CPC .................. *G02B 6/4452* (2013.01)

(58) Field of Classification Search
None
See application file for complete search history.

(56) References Cited

U.S. PATENT DOCUMENTS

| | | | |
|---|---|---|---|
| 8,985,862 B2 * | 3/2015 | Cote .................... | G02B 6/3897 385/59 |
| 9,075,217 B2 * | 7/2015 | Giraud ................. | G02B 6/4452 |
| 9,645,317 B2 * | 5/2017 | Isenhour .............. | G02B 6/3849 |
| 9,720,196 B2 * | 8/2017 | Womack .............. | G02B 6/4452 |
| 10,094,996 B2 * | 10/2018 | Cooke .................. | G02B 6/4452 |

(Continued)

FOREIGN PATENT DOCUMENTS

| | | |
|---|---|---|
| EP | 2159615 A2 | 3/2010 |
| WO | 2011/100611 A2 | 8/2011 |

(Continued)

OTHER PUBLICATIONS

Search Report dated Apr. 14, 2016 issued in corresponding DE patent application No. 10 2015 118 338.2 (and partial English translation thereof).

(Continued)

*Primary Examiner* — Sung H Pak
(74) *Attorney, Agent, or Firm* — Posz Law Group, PLC

(57) ABSTRACT

A patch bay device, in particular for optical waveguide cables, includes at least one connection unit which defines at least one port.
The connection unit has in at least one connection zone a port density of at least 0.55 ports/cm².

25 Claims, 30 Drawing Sheets

(56) References Cited

U.S. PATENT DOCUMENTS

Figure 1A:
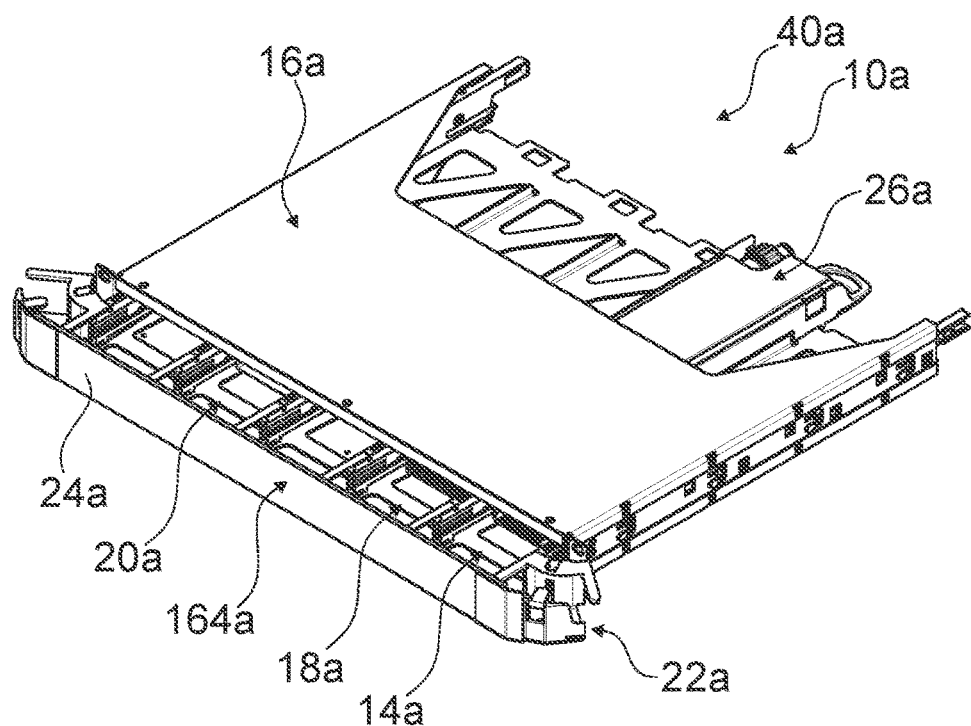

2010/0296790 A1    11/2010  Cooke et al.
2010/0310225 A1    12/2010  Anderson et al.
2010/0322581 A1*   12/2010  Cooke .................. G02B 6/4452
                                                              385/135
2014/0010510 A1     1/2014  Blackard

FOREIGN PATENT DOCUMENTS

WO    2012/058186 A1    5/2012
WO    2016/033577 A1    3/2016

OTHER PUBLICATIONS

International Search Report ("ISR") dated Dec. 22, 2016 issued in corresponding International patent applicatio No. PCT/EP2016/075226.

International Preliminary Report ("IPR") dated May 1, 2018 issued in corresponding International patent application No. PCT/EP2016/075226.

* cited by examiner

PATCH BAY DEVICE, AND MODULAR SYSTEM FOR MAKING A PATCH BAY DEVICE

CROSS REFERENCE TO RELATED APPLICATIONS

This application is a U.S. national stage application of PCT/EP2016/075226 filed on Oct. 20, 2016, which is based on German Patent Application No. 10 2015 118 338.2 filed on Oct. 27, 2015, the contents of which are incorporated herein by reference.

STATE OF THE ART

The invention is based on a patch bay device and on a construction kit system for making a patch bay device.

From the state of the art patch panels for optical waveguide cables are known, which comprise at least one connection unit implemented as a 19 inch insert for connecting to a 19 inch standard rack, the connection unit comprising on a front side a connection zone with a port density of 72 ports/U (rack unit). Herein each port is usually configured to receive a standardized panel plug connector element which is configured for connecting two simplex plug connector elements, a duplex plug connector element and/or an MPO plug connector element.

The objective of the invention is in particular to make a generic patch bay device available that has improved characteristics regarding efficiency. The objective is achieved by the characterizing features of the patch bay device and by the features of the construction kit system for making a patch bay device, while advantageous implementations and further developments of the invention may be gathered from the description and the figures.

ADVANTAGES OF THE INVENTION

The invention is based on a patch bay device, in particular for optical waveguide cables, with at least one connection unit which defines and in particular provides at least one port, advantageously a plurality of ports.

It is proposed that the connection unit has in at least one connection zone, in particular surface zone, a port density of at least 0.55 ports/cm², advantageously at least 0.56 ports/cm² and particularly preferably of at least 0.57 ports/cm².

A "patch bay device" is to be understood, in this context, in particular as at least a part, in particular a sub-assembly, of a patch panel. In particular, the patch bay device can also comprise the entire patch panel. In particular, the patch bay device may herein also comprise at least one cable, preferably optical waveguide cable, in particular for connecting to the connection unit, and/or at least one carrier unit, which may in particular be configured for fastening the connection unit at least indirectly and/or directly.

In this context, a "connection unit" is to be understood in particular as a unit which is advantageously at least partially and preferably at least largely embodied as a cable management unit, and which is in particular, in at least one operating state, configured for managing, in particular guiding, connecting, coupling and/or distributing cables, advantageously a plurality of cables, preferably optical waveguide cables. In particular, the connection unit herein comprises at least one, advantageously precisely one frame unit, in particular a chassis and/or exterior housing, which is preferably fastenable to the carrier unit, and which is configured to at least partially delimit the connection zone. The term "at least largely" is herein to mean, in particular, by at least 55%, advantageously at least 65%, preferably at least 75%, particularly preferentially at least 85% and especially advantageously at least 95%. "Configured" is to mean, in particular, specifically designed and/or equipped. By an object being configured for a certain function is to be understood, in particular, that the object implements and/or carries out said certain function in at least one application state and/or operating state.

Furthermore, a "port" is to be understood, in particular, as a standardized and/or normalized region, in particular receiving region, which is in particular configured to receive, in at least one operating state, in particular optionally, at least one, advantageously precisely one, in particular standardized panel plug connector element, in particular for a device-side terminal, and/or to receive at least a portion of a functional unit, advantageously function monitoring unit, which is in particular embodied differently from a panel plug connector element and is in particular standardized and/or normalized, in particular for the purpose of monitoring a proper function of a cable that is connected to a further panel plug connector element. The panel plug connector element is herein in particular configured to connect at least one simplex plug connector element and/or two simplex plug connector elements, advantageously LC simplex plug connector elements, a duplex plug connector element, advantageously an LC duplex plug connector element, and/or a multifiber plug connector element, advantageously an MPO plug connector element. A "standardized and/or normalized" object is in particular to mean, in this context, an object having normalized measurements, in particular exterior measurements, and differing from a further standardized and/or normalized object in particular merely in its inner structure and/or in its functionality. Moreover, a "port density" is in particular to mean, a number of in particular standardized and/or normalized ports, in particular of the connection unit, per definable and/or defined area, advantageously surface. In particular, the port density thus corresponds to an area density and advantageously a surface density. Especially preferentially the port density corresponds to a number of ports which are visible to a user and/or operator from outside the connection unit, in particular when looking at a front side of the connection unit. By this implementation a generic patch bay device may be made available with improved characteristics as regards an efficiency, in particular a construction space efficiency, a performance efficiency, a component efficiency and/or a cost efficiency. Furthermore, an advantageously flexibly usable and/or adaptable patch bay device may be made available.

The connection unit could herein be embodied, for example, as a 10-inch insert, as a 21-inch insert, as a 24-inch insert and/or as any other insert, in particular for connecting to an, in particular standard, 10-inch rack, 21-inch rack, 24-inch rack and/or any other rack. It is, however, advantageously proposed that the connection unit is embodied as a 19-inch insert, in particular for connecting to an, in particular standard, 19-inch rack, and that the connection zone has a port density of at least 110 ports/U, advantageously at least 112 ports/U, preferably at least 114 ports/U, particularly preferably at least 116 ports/U and especially advantageously at least 118 ports/U. One "U" herein corresponds in particular to one height unit (HE) and/or 44.45 mm. In this way in particular a patch bay device and/or a computing center with a particularly high degree of construction space efficiency and with a particularly great port density is achievable.

If the connection zone is arranged at a front side of the connection unit, in particular in a mounted state of the connection unit, in particular with respect to an intended mounting orientation, a particularly easy accessibility is in particular achievable.

It is further proposed that the connection unit has a modular structure. By the term "having a modular structure" is herein to be understood, in particular, that the connection unit itself and/or at least a structural element of the connection unit has a modular structure and/or is implemented in such a way that it can be assembled module-wise. In particular, in this at least one structural element of the connection unit may be replaced by at least one further structural element, advantageously of the same type. "Objects of the same type" are to be understood, in this context, in particular as objects having advantageously the same construction, which at least partially differ in particular as regards their functionality, their inner structure, and/or their measurements, in particular a material thickness, a width and/or a height. Particularly preferably the connection unit is herein extendable and/or reducible in any desired way, in particular as regards a width, in particular in a mounted state of the connection unit, in particular with respect to the intended mounting orientation, and/or advantageously as regards a height, in particular in a mounted state of the connection unit, in particular with respect to the intended mounting orientation. This in particular allows an especially flexible patch bay device can be made available. Moreover an advantageous extendability is achievable, in particular of existing computing centers.

In an implementation of the invention it is proposed that the connection unit comprises at least one, in particular precisely one frame unit that has a modular structure, in particular the frame unit already mentioned above, due to which the connection unit is in particular extendable and/or reducible in width and/or advantageously in height in a particularly simple fashion. Especially advantageously the frame unit herein comprises at least two cover plates that are implemented at least substantially identical to each other, as well as at least two lateral walls that are implemented at least substantially identical to each other and are advantageously selectable from a group of cover plates and/or lateral walls, depending on a width and/or a height of the frame unit and/or of the connection unit. The phrasing "at least substantially identical" is herein to mean, in particular, identical aside from manufacturing tolerances and/or within the range of manufacturing-associated possibilities and/or within the range of standardized tolerances.

Especially advantageously the connection unit comprises at least one connection module, which provides the at least one port. A "connection module" is to be understood, in this context, in particular as an in particular contiguous and/or inter-connected subassembly, which is in particular arranged in a receiving region of the frame unit, and which in particular comprises precisely one module housing. In particular, the at least one port is herein arranged on a side, in particular front side, of the connection module, which in particular faces towards the front side of the connection unit. Preferentially the connection module comprises front-side and rear-side connection possibilities, in particular in a mounted state of the connection unit, in particular as regards an intended mounting orientation. Particularly preferably the connection unit comprises a plurality of connection modules, in particular at least substantially structurally identical connection modules and/or connection modules of the same type, in particular at least two, at least three, at least four and/or at least five connection modules, which are advantageously arranged one beside the other, in particular with respect to the width of the connection unit. By "at least substantially structurally identical" objects are herein in particular objects to be understood having at least substantially identically implemented exterior shapes which may, however, in particular differ in at least one feature, advantageously in an inner structure, e.g. a type of panel plug connector element. In this way in particular ports may be made available in an especially easy manner.

The connection module could, for example, provide at least six ports or precisely six ports. Advantageously, however, it is proposed that the connection module provides at least 9 ports, preferably at least 12 ports, particularly preferably at least 15 ports and especially advantageously at least 18 ports, in particular in at least one row, advantageously in at least two rows and particularly advantageously in at least three rows. Preferentially the connection module herein makes maximally 36 ports available, in particular no more than 33 ports, advantageously maximally 30 ports, particularly preferably no more than 27 ports and especially advantageously maximally 24 ports, in particular in at least one row, advantageously in at least two rows and especially advantageously in at least three rows. Especially advantageously the connection module provides precisely 18 ports, in particular in precisely three rows, and thus in particular six ports per row. As a result of this, in particular an advantageously flexible connection module may be provided that is at the same time particularly efficient, in particular construction-space efficient and/or cost-efficient.

In a preferred implementation of the invention it is proposed that the connection module has a height, in particular relative to a height of the connection unit, in particular relative to an intended mounting orientation, of at least 1.78 cm, in particular at least 0.40 U, and/or maximally 3.56 cm, in particular maximally 0.80 U. Especially advantageously the connection module has a height of at least substantially, in particular aside from tolerances, of precisely 3.33 cm and/or at least substantially, in particular aside from tolerances, precisely 0.75 U. Thus in particular a particularly space-saving arrangement is achievable. Moreover, in particular, a construction space that has been made available can be used efficiently, in particular in an economically particularly relevant connection unit having a height of 3 U.

It is also proposed that the connection module has a width which is, in particular with respect to a width of the connection unit, maximally 10 cm and advantageously maximally 9 cm, and/or has a width of maximally a quarter and advantageously no more than a fifth of the width of the connection unit. This allows, in particular, further improving an efficiency as regards construction space.

Furthermore it is proposed that the connection module is, in particular with respect to the frame unit, releasable, connectable and/or replaceable individually and independently from further connection modules, in particular the connection unit. This allows achieving an especially flexible exchange of connection modules.

A particularly high degree of flexibility and/or extendability is achievable in particular if the connection module has a modular structure.

In an implementation of the invention it is proposed that the connection unit comprises at least one module holder, which is in particular movable and/or movably supported relative to the frame unit, in particular pivotably and/or advantageously linearly movable, which module holder is movable, advantageously linearly movable, from at least one stowage position into at least one processing position and vice versa, and which is configured to receive the connection module, in particular in a motionally rigid fashion. Preferably the module holder herein comprises at least one, advantageously precisely one support plate and/or at least one support wall, advantageously a plurality of support walls, which at least partially delimit in particular at least one module receiving region, in particular for receiving the connection module. Advantageously a contour and/or shape of the module holder is herein at least partially adapted to a shape and/or contour of the frame unit. Especially advantageously the module holder is configured to receive a plurality of connection modules, in particular at least two, at least three, at least four and/or at least five, advantageously precisely five connection modules, in particular simultaneously, advantageously adjacent to each other, in particular with respect to a width of the connection unit. Preferably the connection modules are herein respectively separated by at least one support wall. By the term "in a motionally rigid fashion" is herein to be understood, in particular, that a movement of the module holder results in a simultaneous and advantageously uniform movement of the connection module that is arranged in the module holder. A "stowage position" is to be understood, furthermore, in particular as a position in which the connection module, in particular at least the port, which is in particular arranged in the module holder, is not accessible, only partially accessible and/or accessible with difficulty, in particular without affecting at least one further connection module that is in particular arranged in the module holder. By a "processing position" is to be understood, in particular, a position in which the connection module, in particular the port, which is in particular arranged in the module holder, is easily accessible and/or accessible independently from at least one further connection module, which is in particular arranged in the module holder. This allows in particular advantageously processing of a connection module and/or advantageously independently changing of cable configurations.

It is moreover proposed that the connection module is at least introducible into the module holder, in particular the module receiving region, from a rear side, advantageously by way of a linear movement, for mounting and/or is at least removable out of the module holder, in particular the module receiving region, from a rear side, advantageously by way of a linear movement, for demounting. Preferably the connection module is herein, for a mounting, introducible into the module holder, in particular the module receiving region, in particular optionally, from the front and/or from the rear, advantageously by way of a linear movement and/or, for a demounting, removable out of the module holder, in particular the module receiving region, in particular optionally, from the front and/or from the rear, advantageously by way of a linear movement. This allows achieving a particularly flexible mounting and/or demounting of a connection module.

In a preferred embodiment of the invention it is proposed that the connection unit comprises at least one, advantageously precisely one, protective element, which is configured in at least one operating state, in particular protection operating state, to cover the connection zone at least partially and preferably at least to a large part, in particular at least if viewed perpendicularly to the connection zone and/or to the front side of the connection unit, and in particular to protect the connection zone from being touched. In particular, the protective element is arranged in a front side region of the connection unit.

Advantageously the protective element is herein supported in such a way that it is pivotable, relative to the frame unit, about a pivot axis which extends, in particular, in a direction of a width of the connection unit. Particularly preferably the protective element comprises at least one in particular translucent and/or advantageously transparent sight region, which is in particular configured to allow a view at least onto a portion of the connection zone and/or the entire connection zone, in particular without having to remove the protective element. As a result of this, in particular, a protection efficiency can be improved, advantageously allowing an avoidance of inadvertently touching plug connector elements that are arranged in panel plug connector elements.

In a preferred embodiment of the invention it is proposed that the connection unit comprises at least one protective element, in particular the previously mentioned protective element, which is configured to at least partially cover the connection zone in at least one operating state, and which is connected to the module holder. In particular, the protective element is herein movable together with the module holder, in particular uniformly and/or simultaneously. The protective element could herein be connected to the module holder at least partially in a one-part implementation. Advantageously, however, the protective element is embodied in such a way that it can be coupled with the module holder and/or can be fastened at the module holder. Advantageously the protective element herein comprises at least one magnet lock, which is in particular configured to hold and/or fixate the protective element in the protection operating state, in particular in such a way that the connection zone is covered at least partially, advantageously at least to a large part. By an object being "connected at least partially in a one-part implementation" to a further object is to be understood, in this context, in particular that at least one structural element of the object and/or the object is connected to at least one structural element of the further object and/or to the further object in a one-part implementation. A "one-part implementation" is in particular to mean, in this context, at least connected by substance-to-substance bond. The substance-to-substance bond can be established, for example, by an adhesive bonding process, an injection molding process, a welding process, a soldering process and/or another process. Advantageously, a "one-part implementation" is to mean formed from one piece and/or in one piece. Preferably said one piece is produced of one single blank, one mass and/or one cast, e.g. in an extrusion procedure, in particular a one-component and/or multi-component extrusion procedure, and/or in an injection molding procedure, in particular a one-component and/or multi-component injection molding procedure. In this way in particular an advantageously flexible protection effect is achievable, in particular in the stowage position and in the processing position.

Advantageously the connection unit comprises at least one front-side cable manager unit, which is configured in at least one operating state to feed at least one cable, advantageously a plurality of cables, advantageously optical waveguide cables, to the connection zone. Herein a "front-side cable manager unit" is to be understood, in particular, as a unit that is in connection in particular with the connection unit, advantageously with the front side of the connection unit, and is advantageously arranged in a region of the front side of the connection unit, and which is in particular configured to at least partially guide and/or hold the at least one cable, advantageously a plurality of cables. This allows achieving in particular an especially efficient and/or flexible cable guidance. Moreover, possible maximum bending radiuses of the cables may advantageously be kept to.

If the connection unit comprises at least one front-side cable manager unit, in particular the already previously mentioned front-side cable manager unit, that is configured in at least one operating state to feed at least one cable to the connection zone, and which is connected to the module holder, in particular a constant cable guidance is achievable, wherein a movement of plug connector elements that are arranged in panel plug connector elements is advantageously avoidable. In particular, the front-side cable manager unit is herein movable together with the module holder, in particular uniformly and/or simultaneously. The front-side cable manager unit could herein be connected to the module holder at least partially in a one-part implementation. Advantageously, however, the front-side cable manager unit is implemented in such a way that it can be at least coupled with the module holder and/or that it can be fastened to the module holder.

Furthermore it is proposed that the connection unit comprises at least one rear-side cable manager unit which is stationary and/or immovable, in particular relative to the module holder, and which is advantageously fixated to the frame unit, and which is configured in at least one operating state to feed at least one cable, advantageously a plurality of cables, advantageously optical wave guide cables, to the connection module, in particular to a rear-side region of the connection module and/or to a side of the connection module that faces away from the front side of the connection unit. A "rear-side cable manager unit" is herein to be understood, in particular, as a unit that is in connection in particular with the connection unit, advantageously with a rear side of the connection unit, which is in particular situated opposite to the front side of the connection unit, and is in particular configured to at least partially guide and/or hold the at least one cable, advantageously a plurality of cables. In this the rear-side cable manager unit advantageously comprises at least one cable divider and/or at least one stress relief element, in particular for a stress relief of the at least one cable. In this way in particular an especially efficient and/or flexible cable guidance is achievable.

If the rear-side cable manager unit has a modular structure, in particular a flexibility of the patch bay device is further improvable.

A particularly simple and/or effective assembly and/or disassembly is/are achievable in particular if the rear-side cable manager unit can be coupled to the connection module, in particular in the module holder, in particular the module receiving region, for a mounting and/or demounting of the connection module, in particular from the rear. For this purpose, the rear-side cable manager unit and/or the connection module preferably comprise/comprises at least one coupling element, which is advantageously embodied as a hook element, a hook receptacle, a pin element and/or a pin receptacle. In particular, it is also conceivable that, for a mounting and/or demounting, in particular from the rear, a plurality of connection modules can be coupled to the rear-side cable manager unit and/or a plurality of rear-side cable manager units can be coupled to the connection module.

If the rear-side cable manager unit defines at least one cable overlength receiving region, in particular for receiving an overlength of the at least one cable, in particular in a movement of the module holder and/or of the connection module, in particular from the stowage position into the processing position and vice versa, in particular a movement and/or a tensile stress of the at least one cable can be avoided.

In a further implementation of the invention it is proposed that the connection unit, advantageously at least the module holder, comprises at least one functional unit receiving zone, which is allocated and/or associated to at least one connection module and is configured to receive at least one, advantageously precisely one functional unit that differs from a connection module, from a front-side cable manager unit, from a rear-side cable manager unit and from a protective element. The functional unit may herein be implemented as any type of functional unit, e.g. as a display unit, in particular to display at least one signal of the function monitoring unit, to indicate a type of a panel plug connector element that is arranged in a port, and/or to allocate a plug connector element that is arranged in the panel plug connector element, as a supply unit, in particular for an energy supply of the function monitoring unit, and/or as a control unit, in particular for controlling the function monitoring unit. This allows in particular enhancing a multi-purpose aspect of the patch bay device. Moreover an efficiency, in particular a time efficiency, can be optimized, in particular as regards an allocation of the ports.

The invention is further based on a construction kit system for making a patch bay device, with at least one construction kit that is a construction kit for making a frame unit, a connection module, a module holder, a front-side cable manager unit, a protective element, a rear-side cable manager unit and/or one of the functional units allocated to the connection module. A "construction kit system" is to be understood, in particular, as a system of at least one construction kit and at least one further object. By a "construction kit" is to be understood, in this context, in particular a system with at least one group of objects having, in particular at least partially and preferably at least to a large part, an identical structure and/or advantageously an identical function, from which group in particular at least one object can be chosen and/or selected in particular depending on a respective objective of the system, on respective system parameters, on a certain purpose and/or on other objects, in particular of the construction kit system; wherein the object can advantageously be combined with at least one other object, in particular of the construction kit, and/or with the at least one further object, in particular of the construction kit system, as a result of which a variety of patch panels and/or patch bay devices are advantageously manufacturable, in particular mountable and/or assemblable, in a flexible fashion. The at least one group of objects may herein comprise, in particular, any number of objects. This allows, in particular, improving efficiency, in particular construction space efficiency, performance efficiency, component efficiency and/or cost efficiency, as well as providing an advantageously flexibly applicable and/or adaptable patch bay device.

Moreover, the invention is based on a method for making a patch bay device using the aforementioned construction kit system, in which at least one object is selected from at least two groups and then at least the selected objects are combined, thus allowing in particular an advantageously flexible manufacturing of different patch panels and/or patch bay devices.

Herein the patch bay device and/or the construction kit system for making the patch bay device are not to be restricted to the application and implementation form mentioned above. In particular, for the purpose of making the patch bay device for fulfilling a functionality herein described, the patch bay device and/or the construction kit system may comprise a respective number of individual elements, structural components and units that differs from the number herein mentioned.

DRAWINGS

Further advantages may be gathered from the following description of the drawings. In the drawings two exemplary embodiments of the invention are shown. The drawings, the description and the claims contain a plurality of features in combination. The person having ordinary skill in the art will purposefully also consider the features separately and will find further expedient combinations.

Figure 1B:
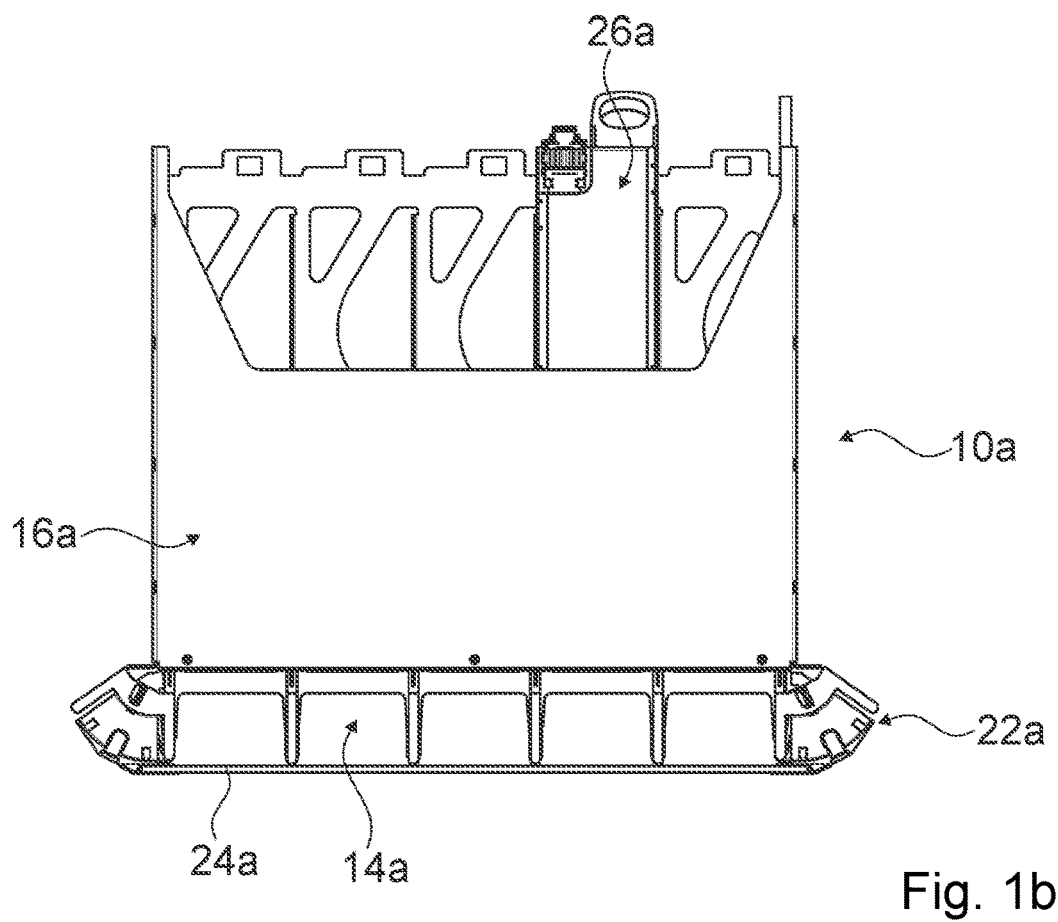
Figure 2A:
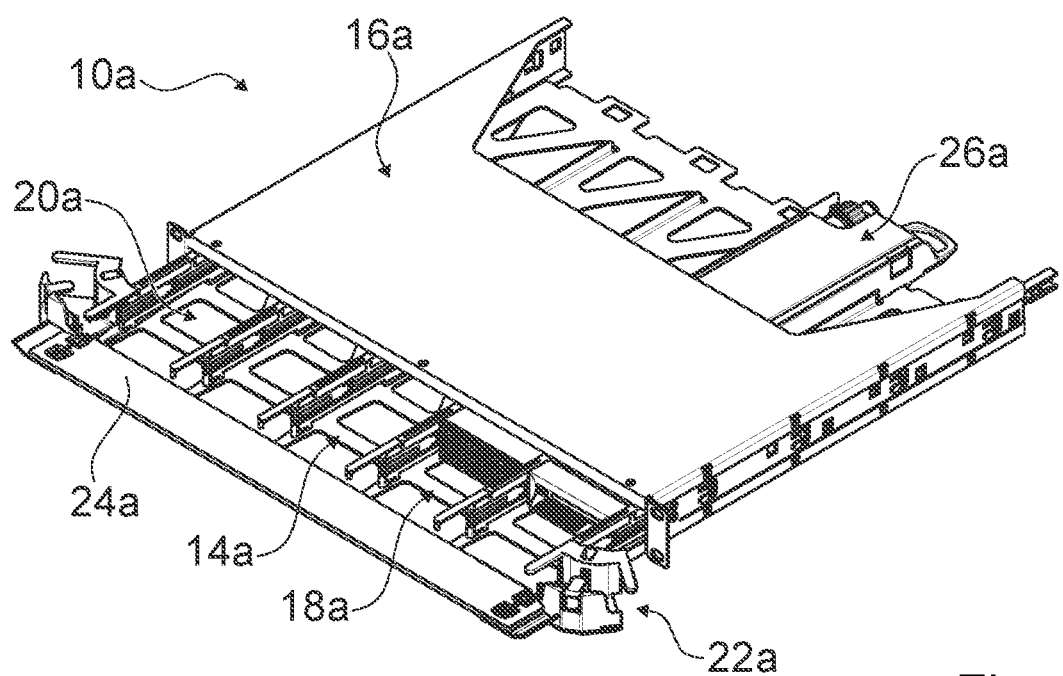
Figure 2B:
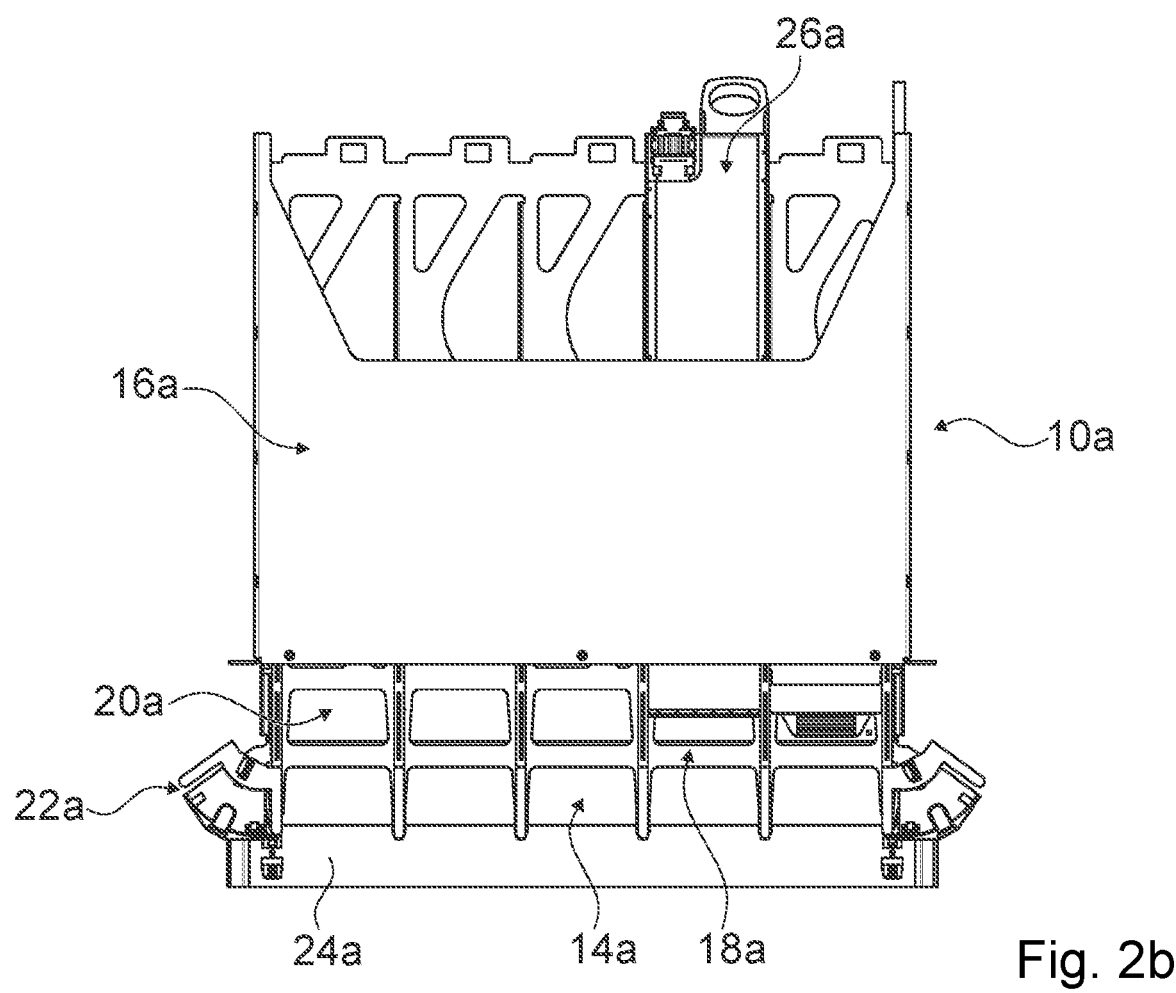
Figure 2C:
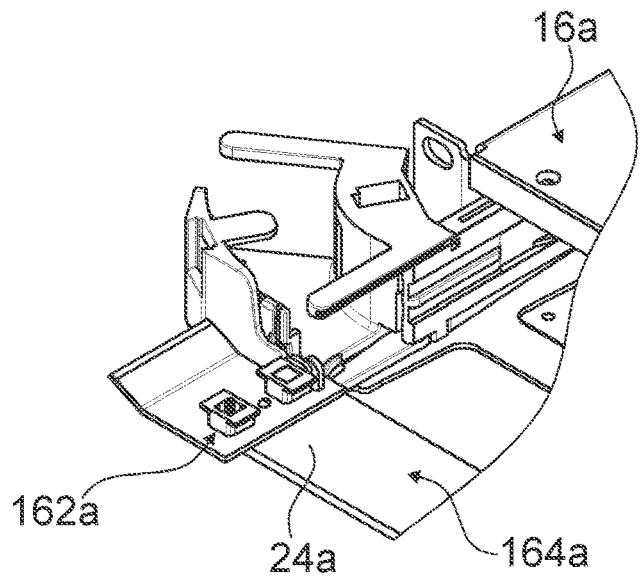
Figure 3A:
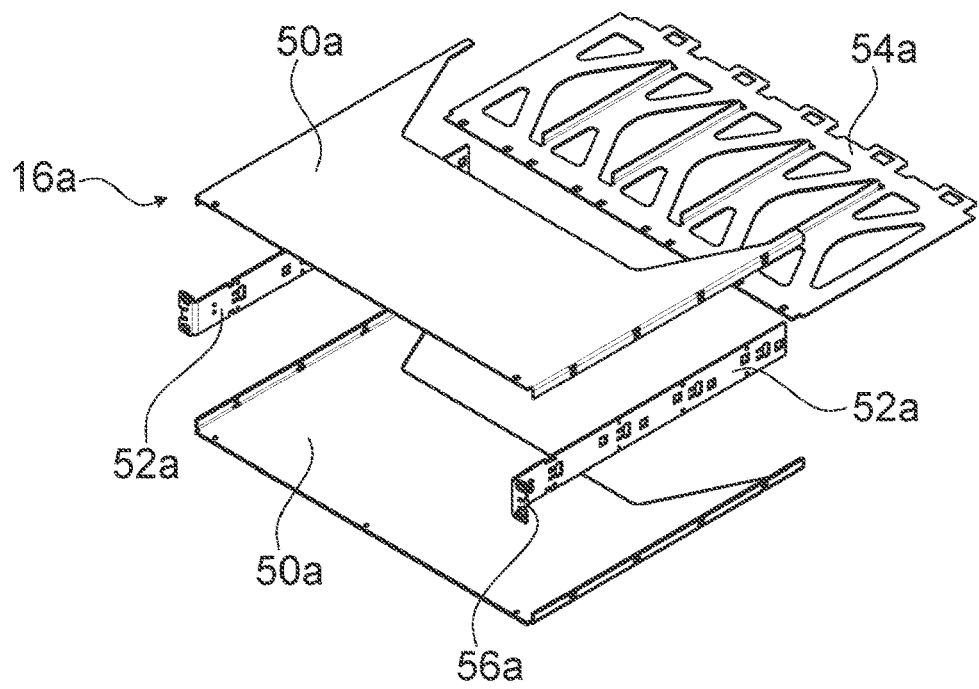
Figure 3B:
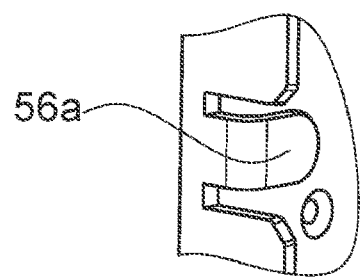
Figure 4A:
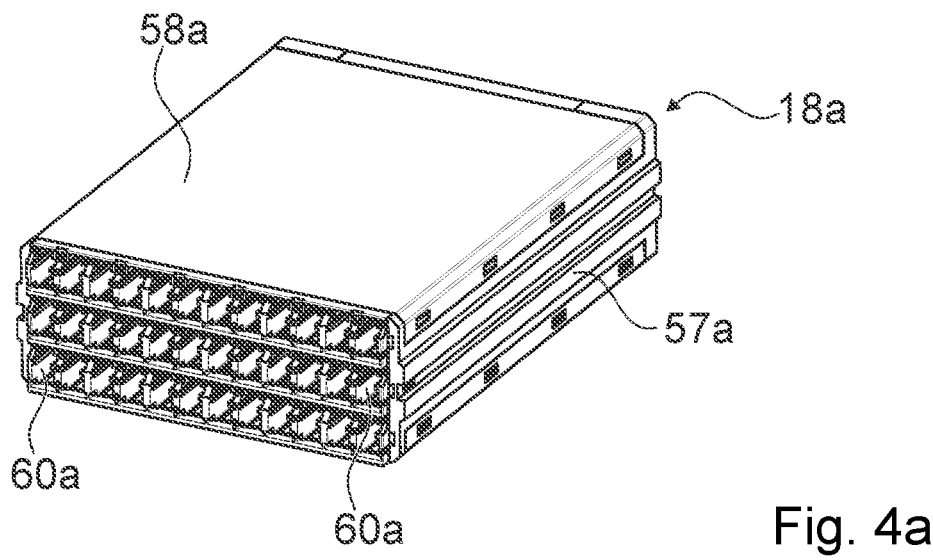
Figure 4B:
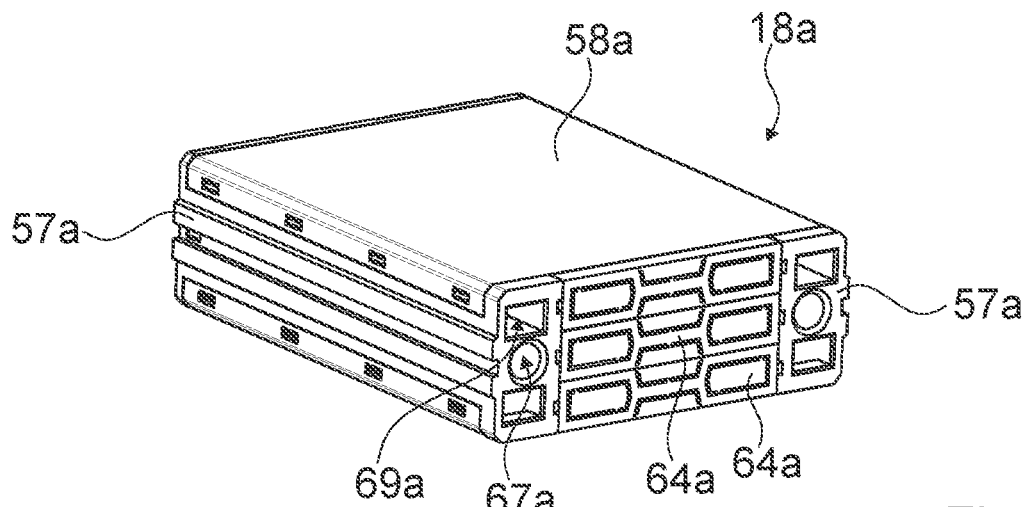
Figure 4C:
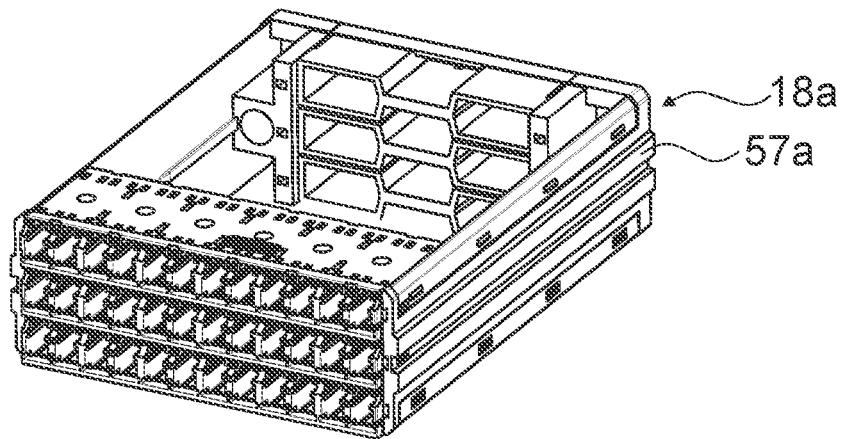
Figure 4D:
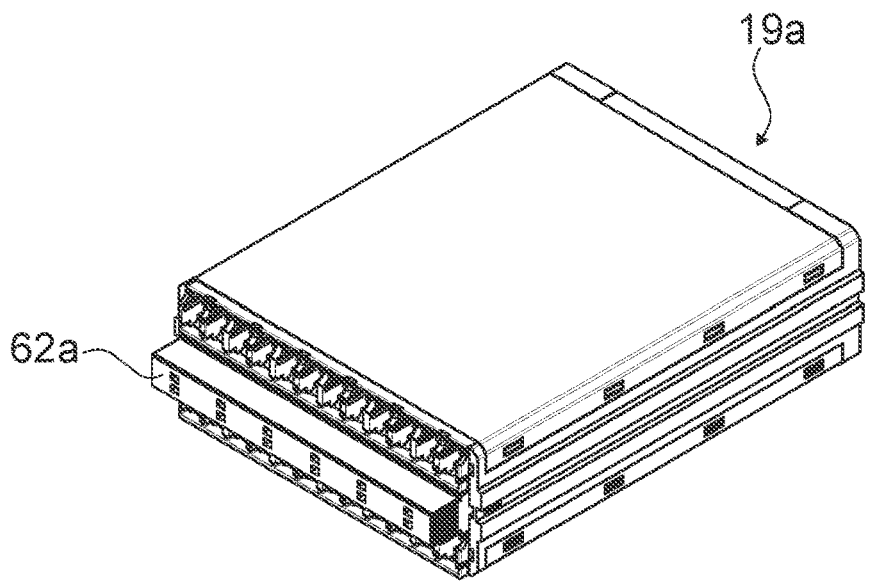
Figure 4E:
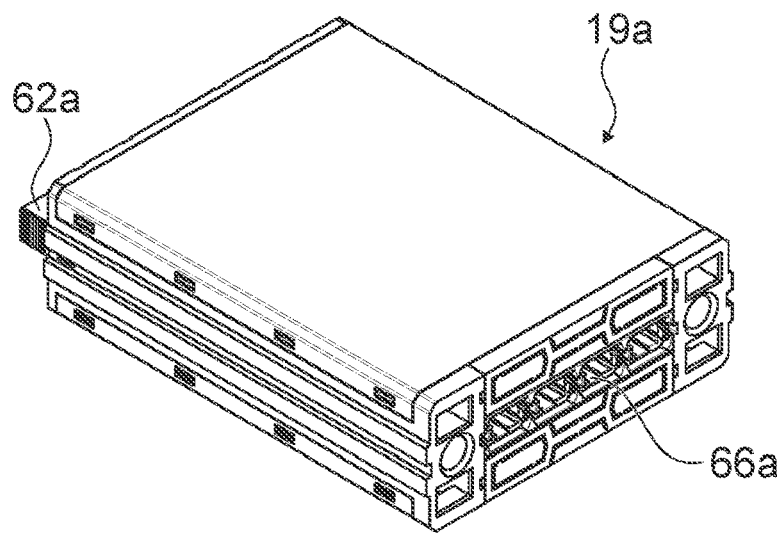
Figure 5A:
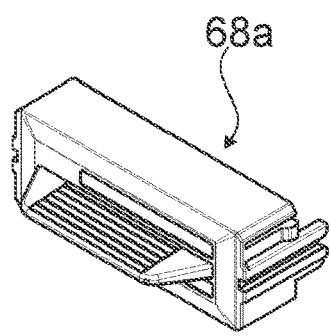
Figure 5B:
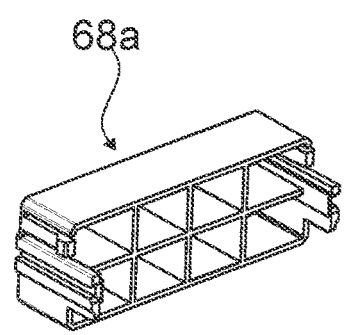
Figure 6A:
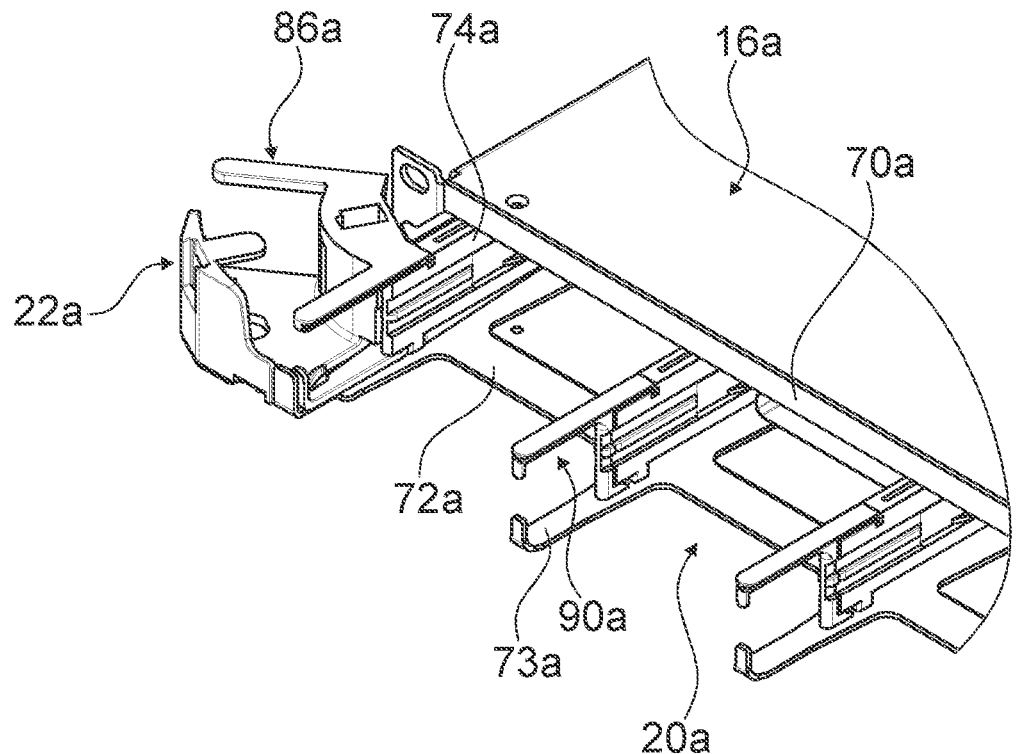
Figure 6B:
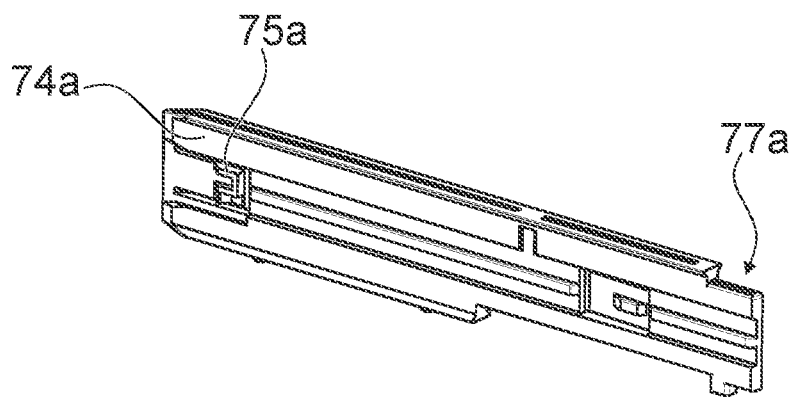
Figure 6C:
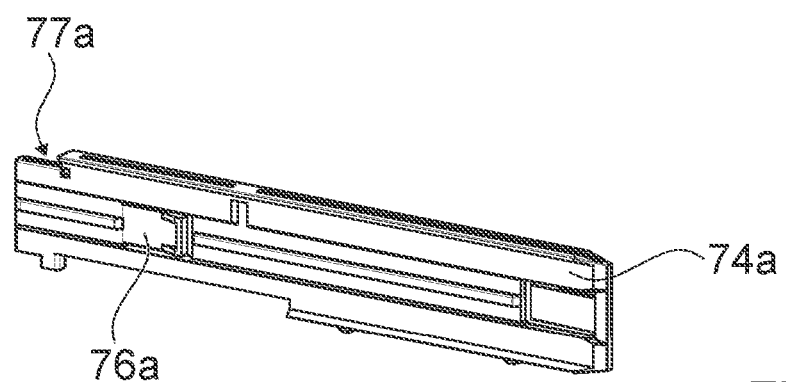
Figure 7A:
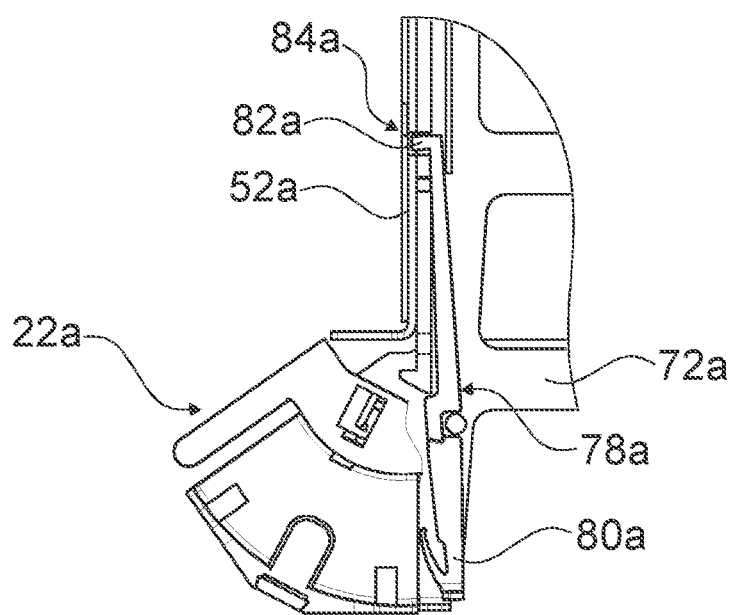
Figure 7B:
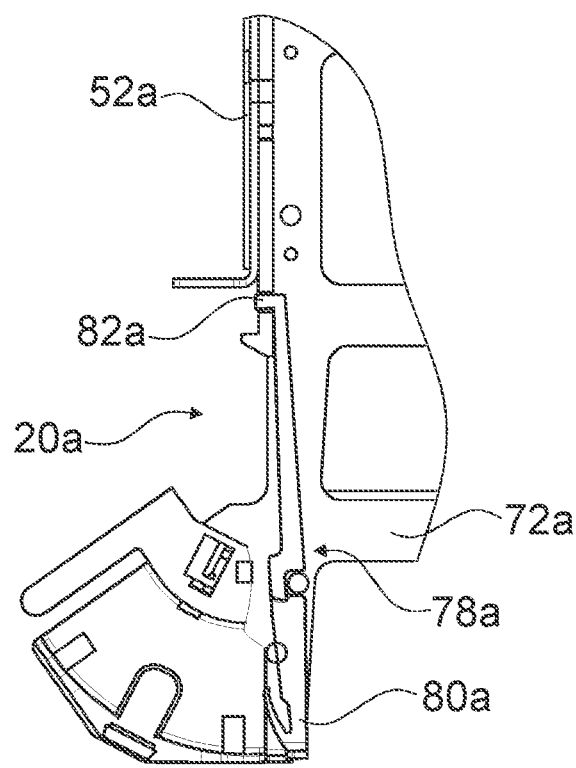
Figure 8A:
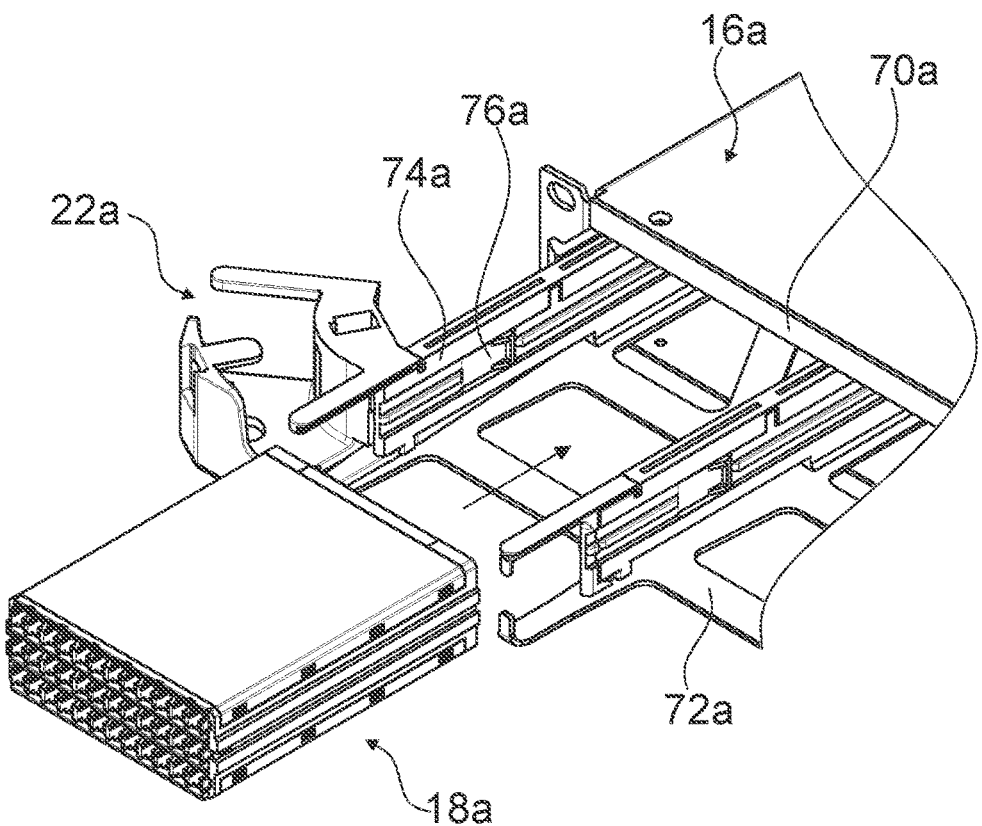
Figure 8B:
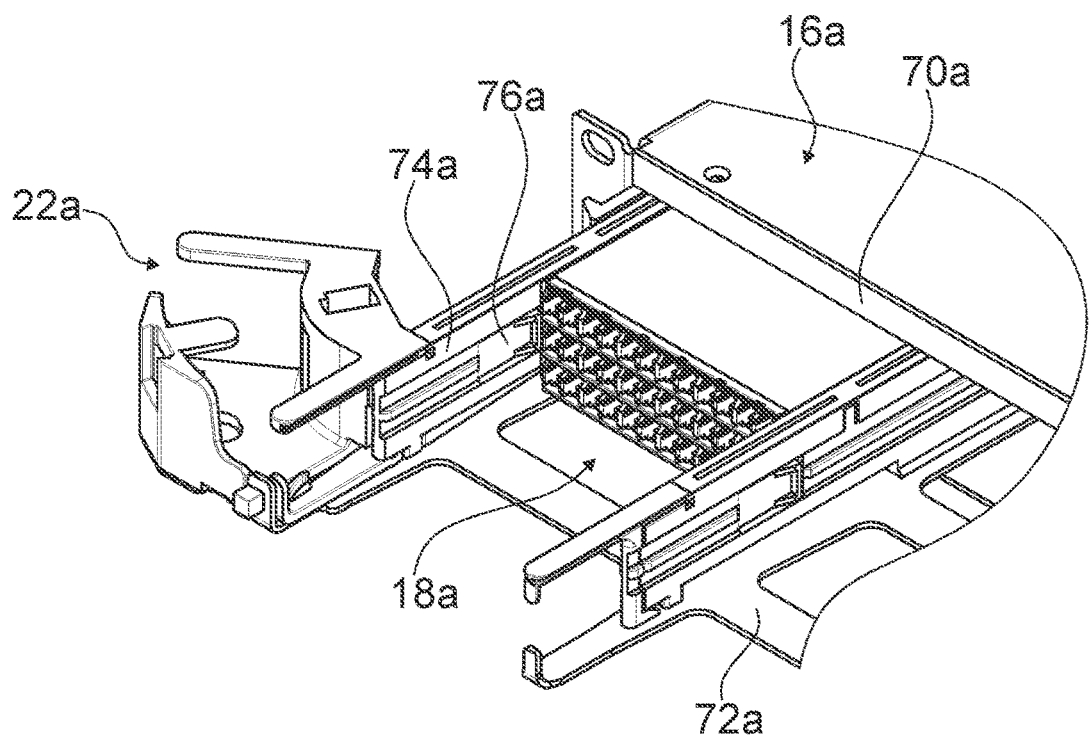
Figure 9:
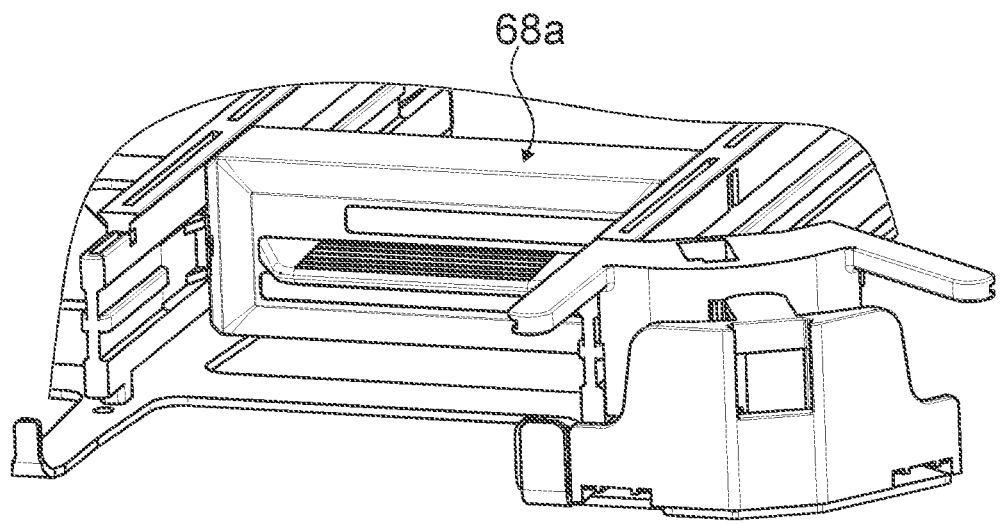
Figure 10:
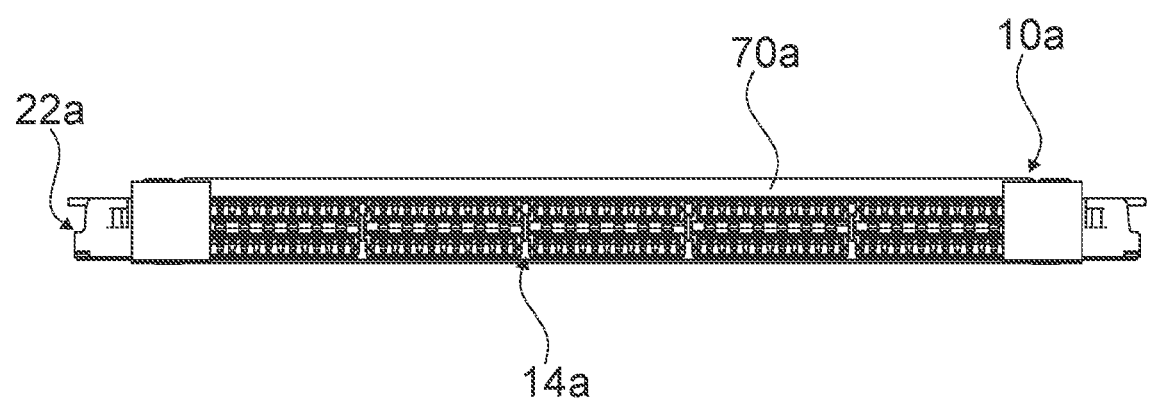
Figure 11A:
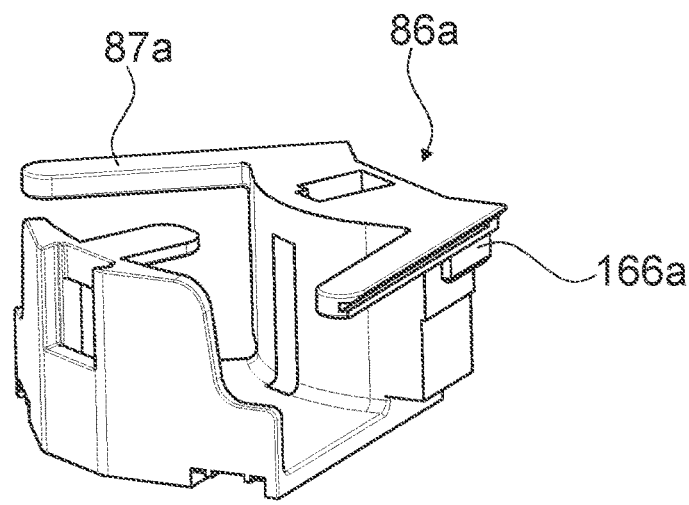
Figure 11B:
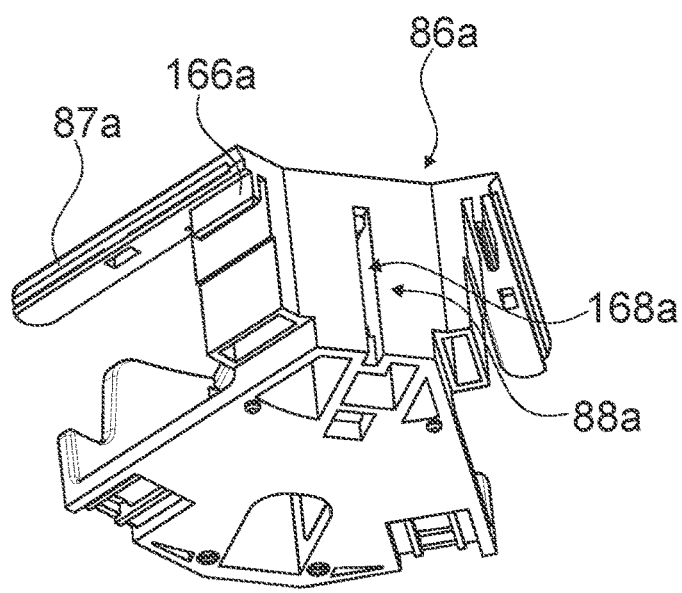
Figure 11C:
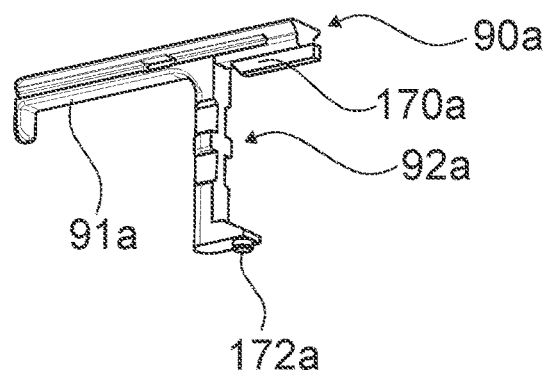
Figure 11D:
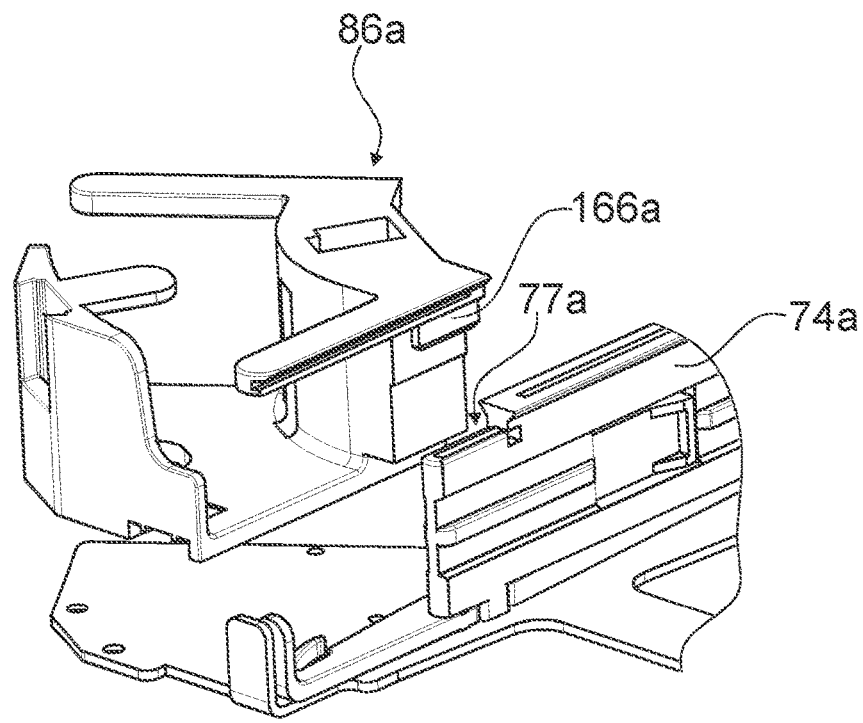
Figure 11E:
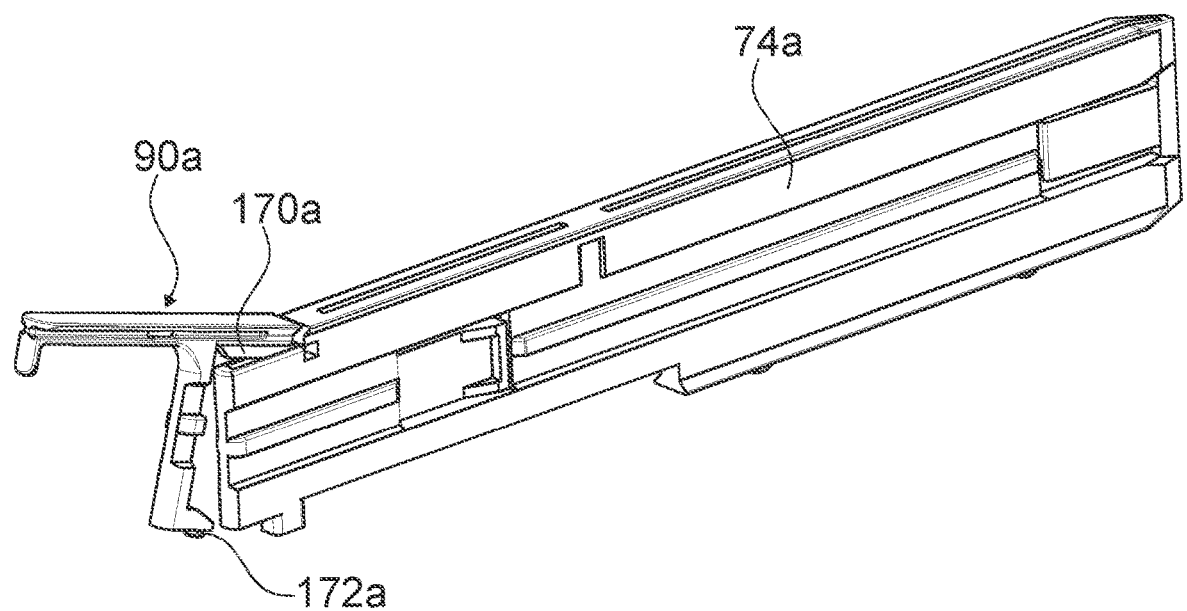
Figure 12A:
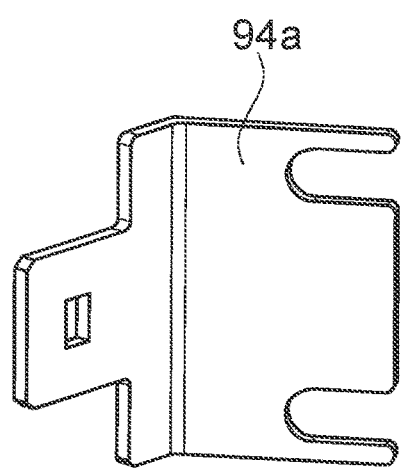
Figure 12B:
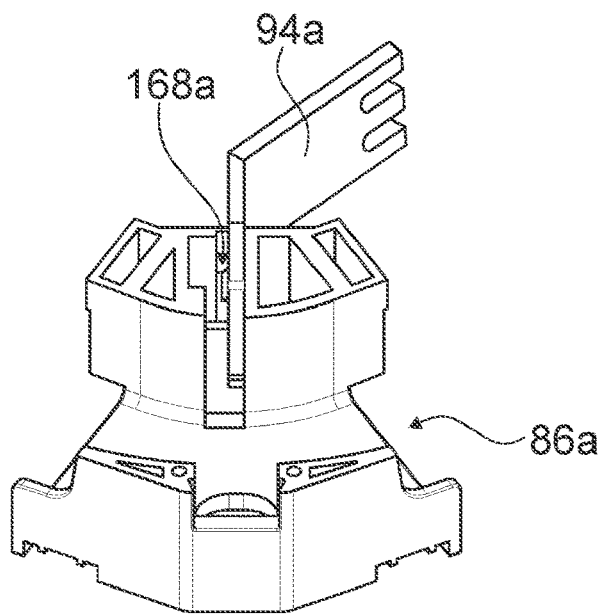
Figure 12C:
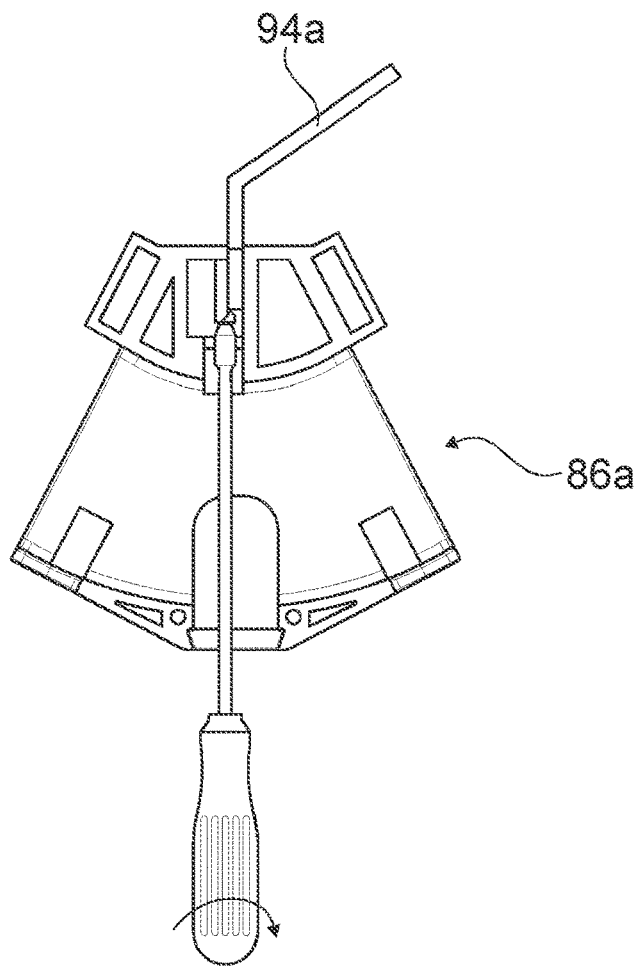
Figure 13A:
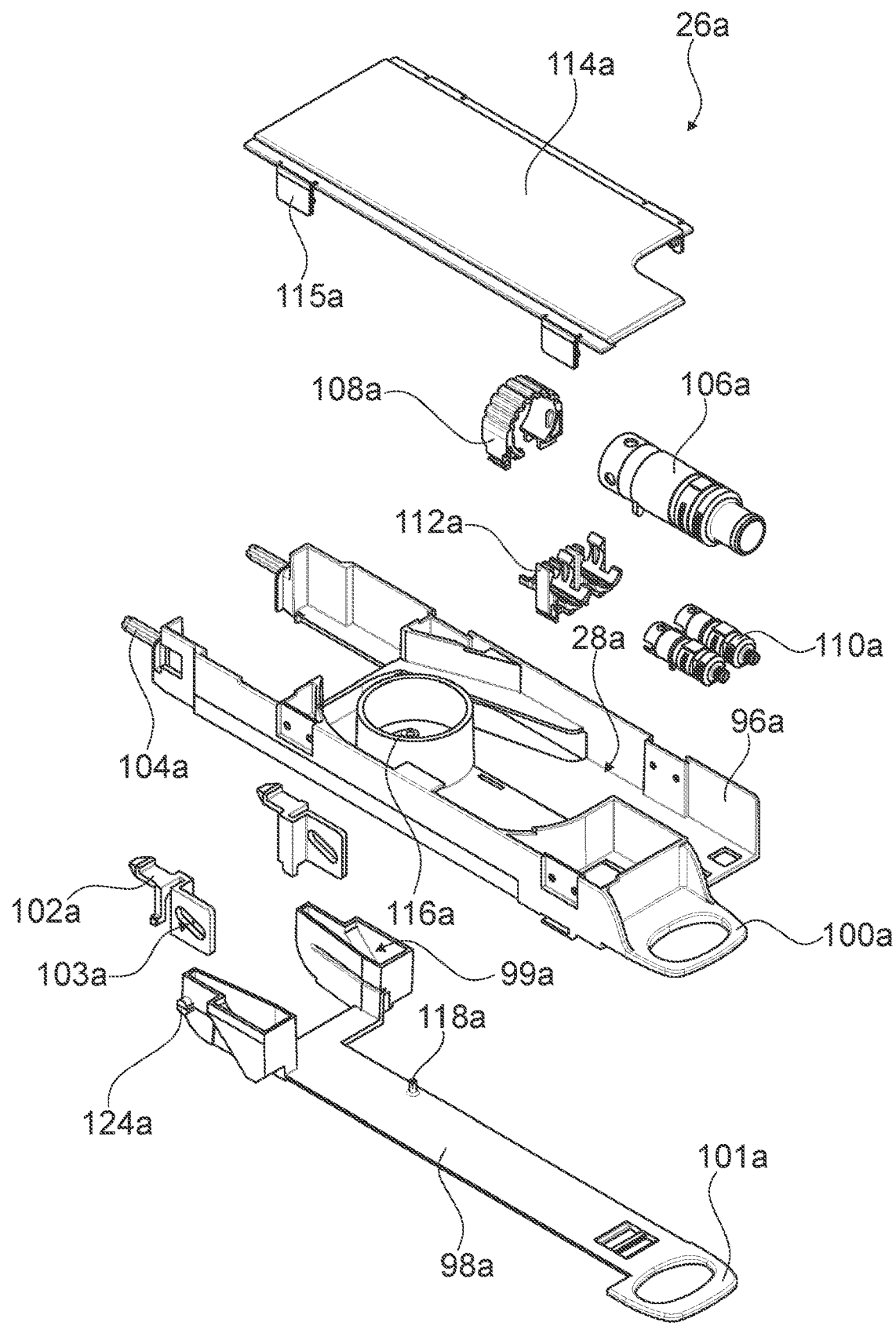
Figure 13B:
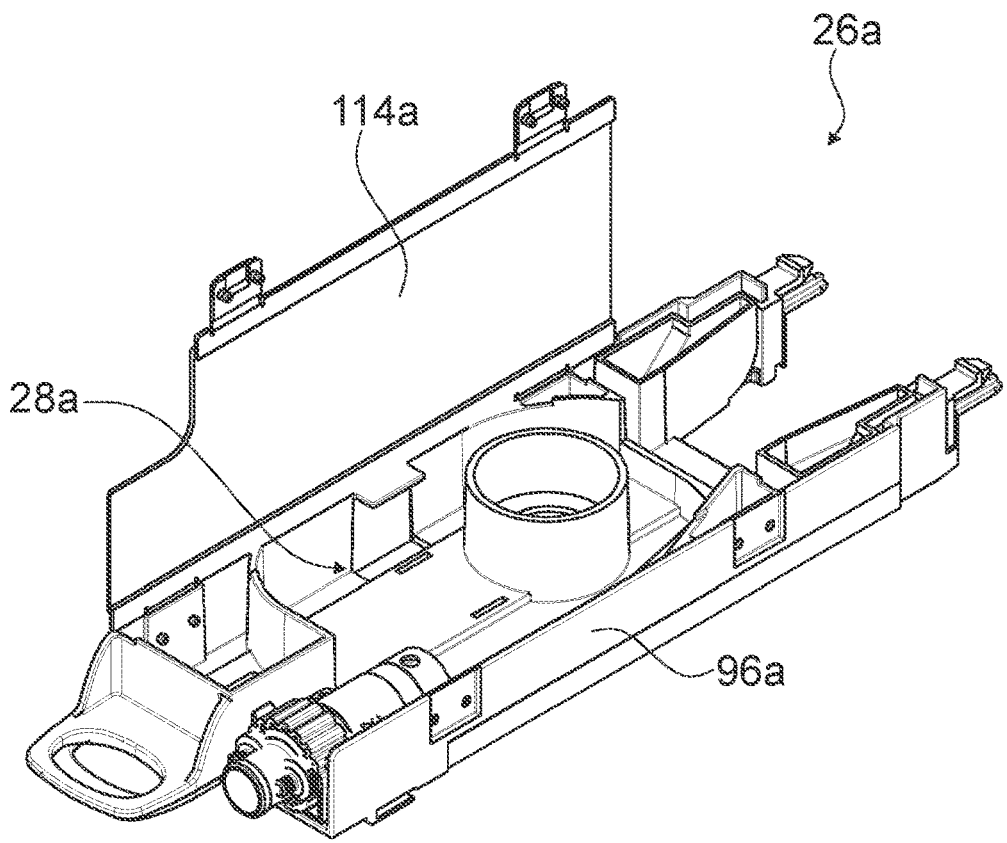
Figure 13C:
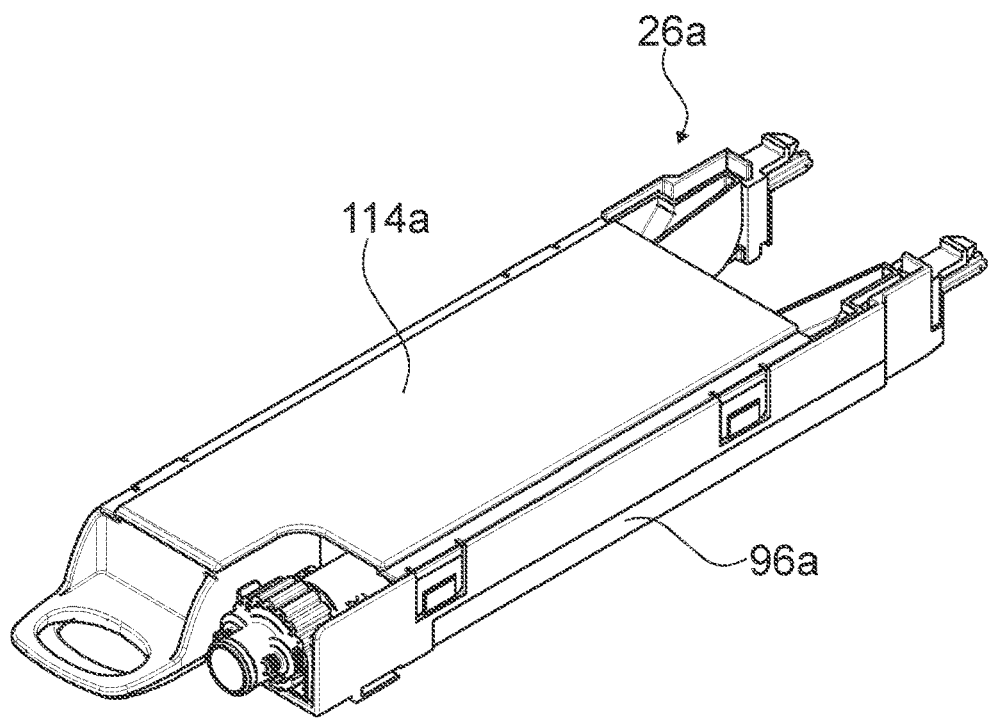
Figure 14A:
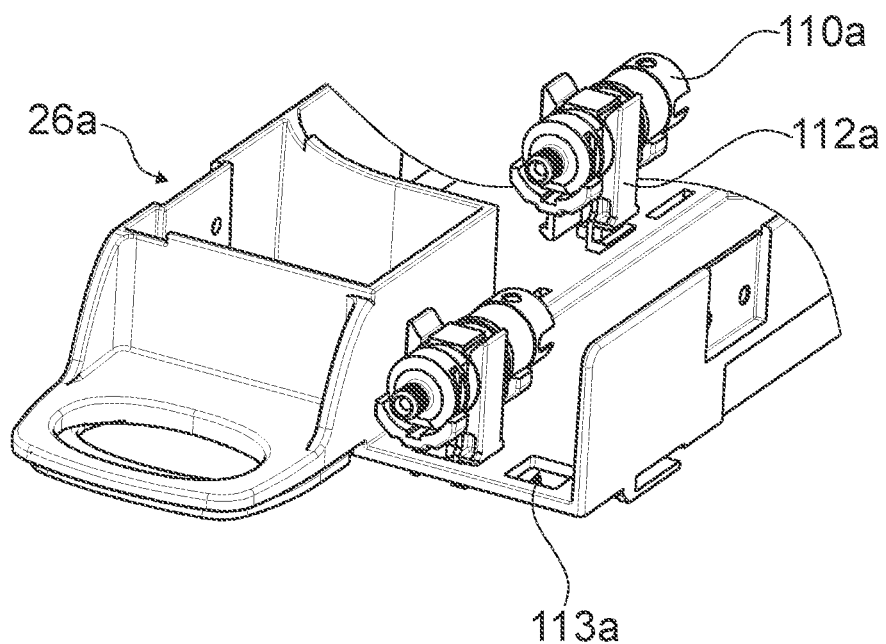
Figure 14B:
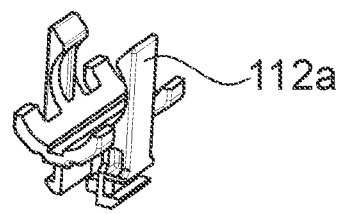
Figure 14C:
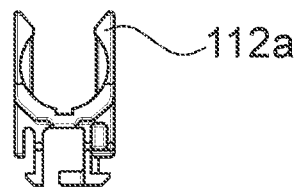
Figure 15A:
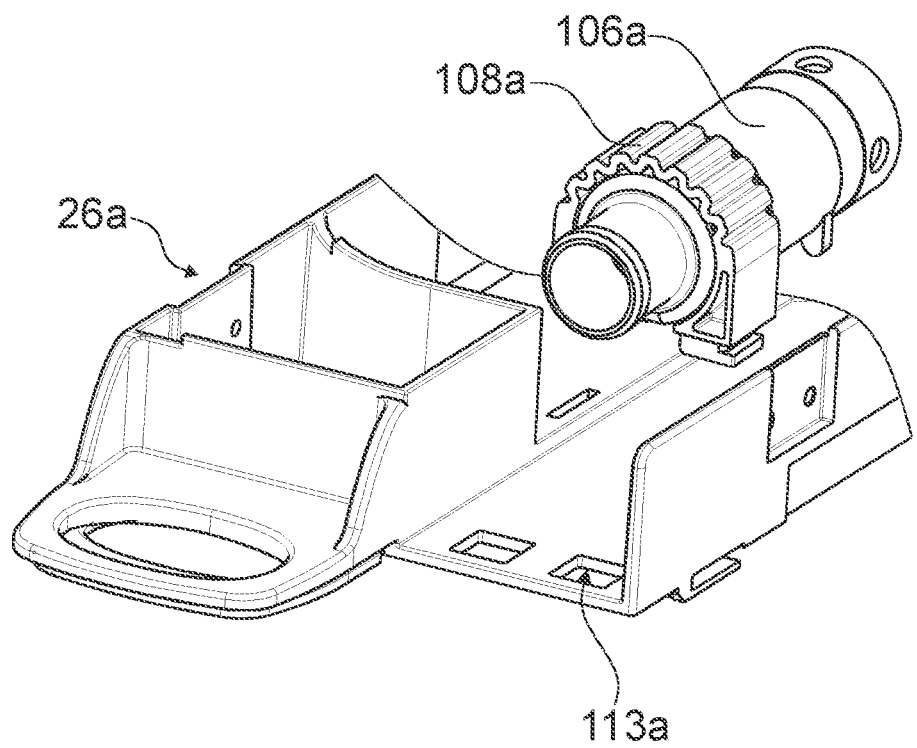
Figure 15B:
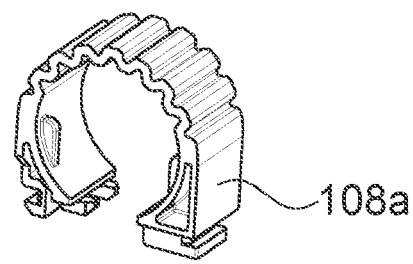
Figure 15C:
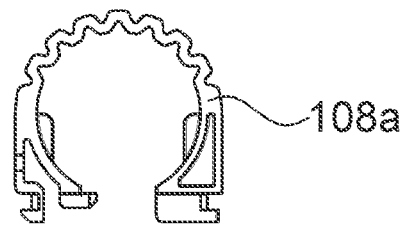
Figure 16A:
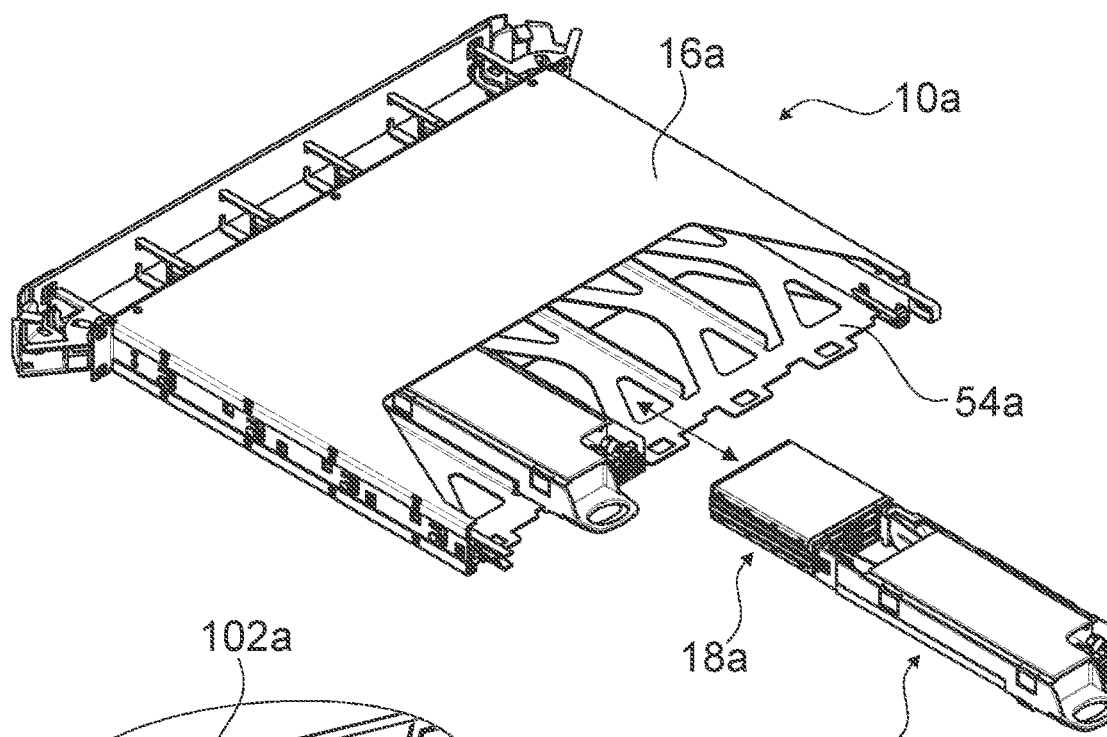
Figure 16B:
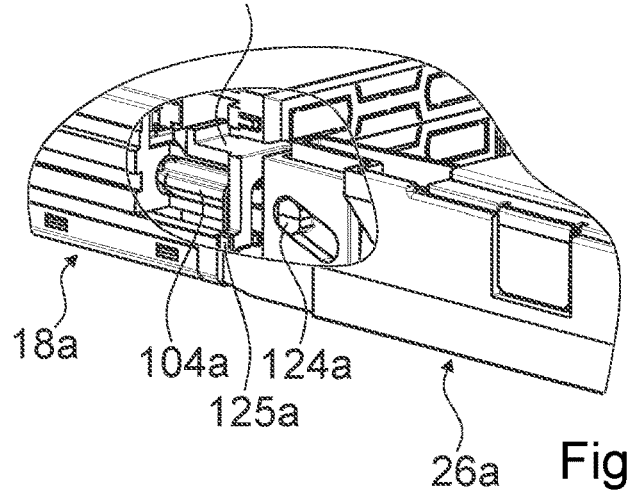
Figure 16C:
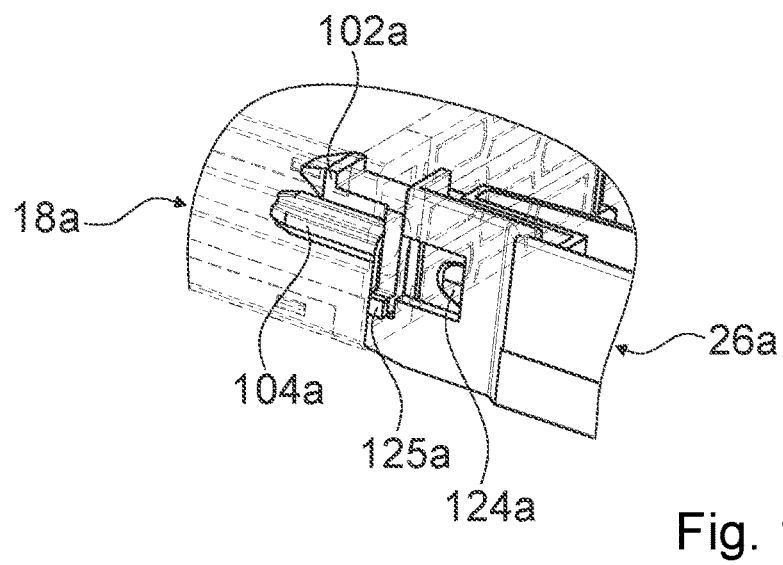
Figure 16D:
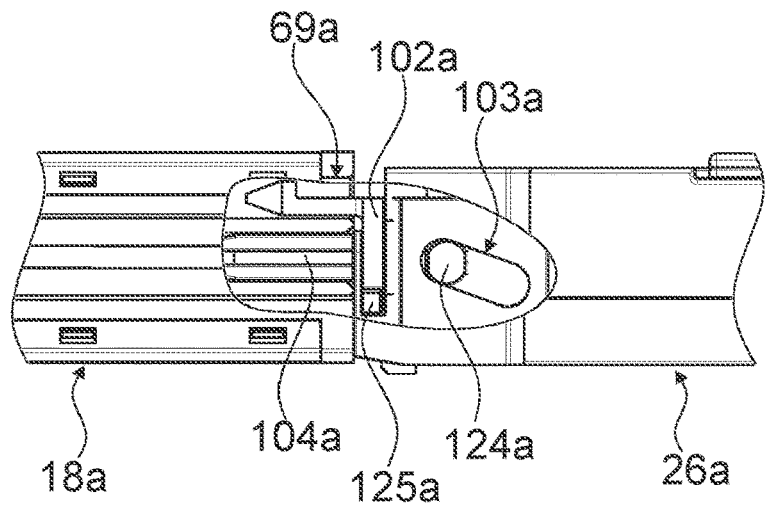
Figure 16E:
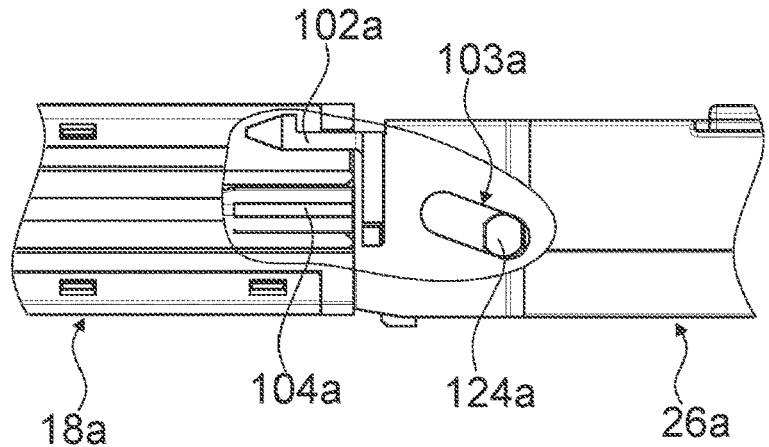
Figure 16F:
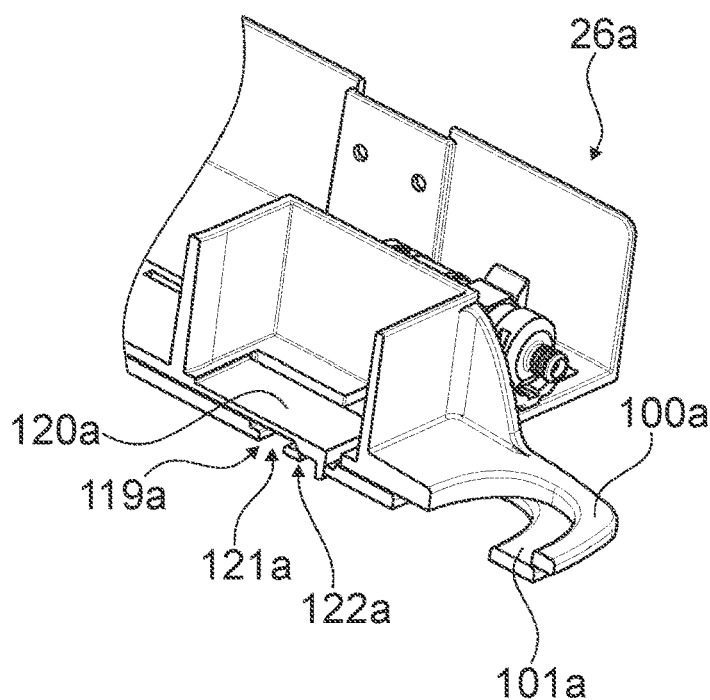
Figure 17A:
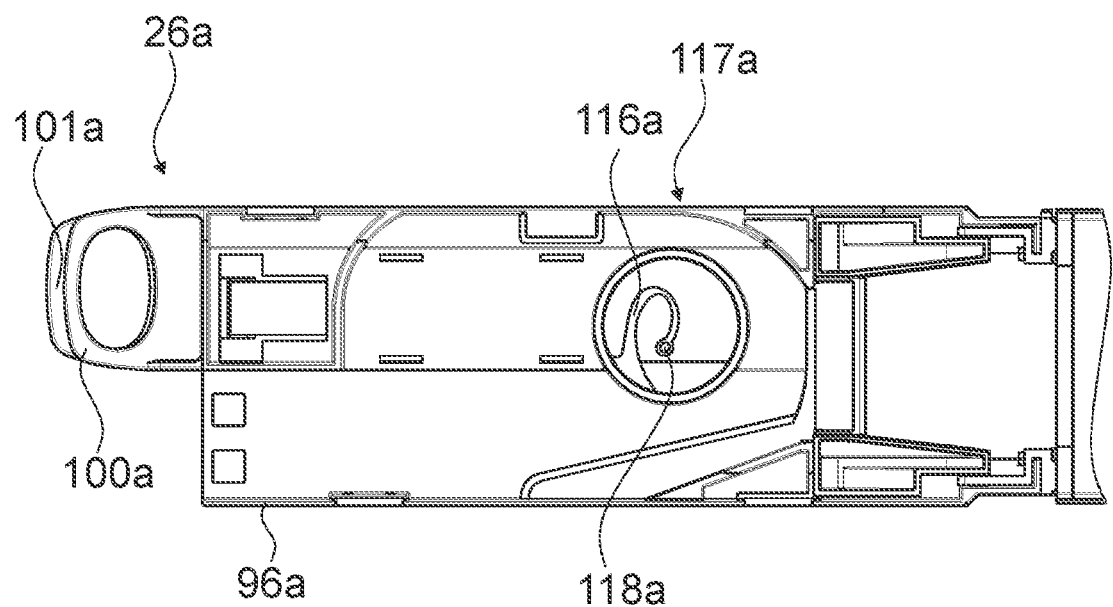
Figure 17B:
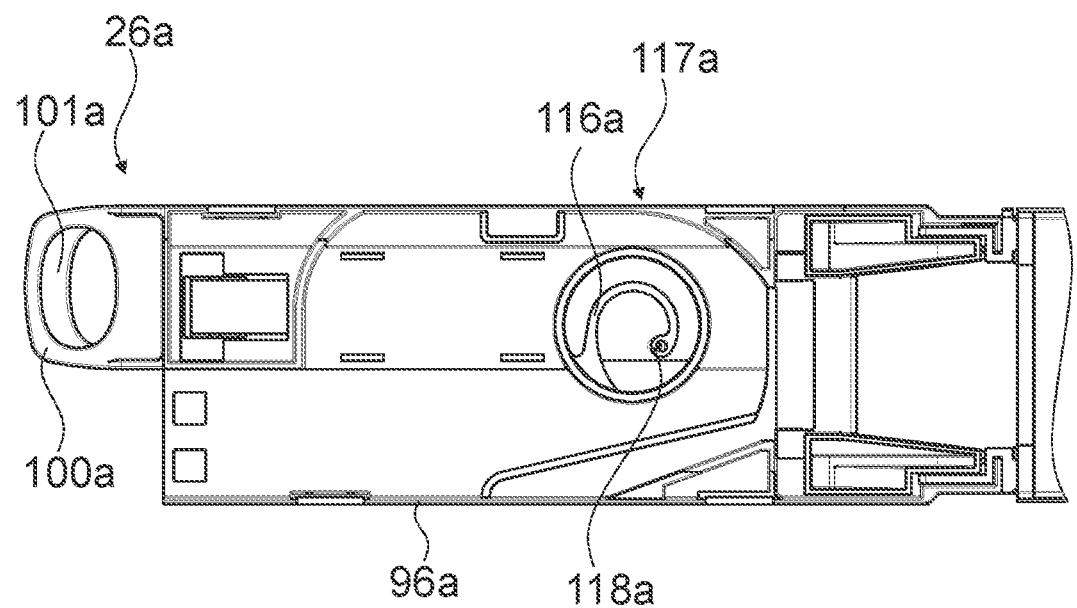
Figure 18A:
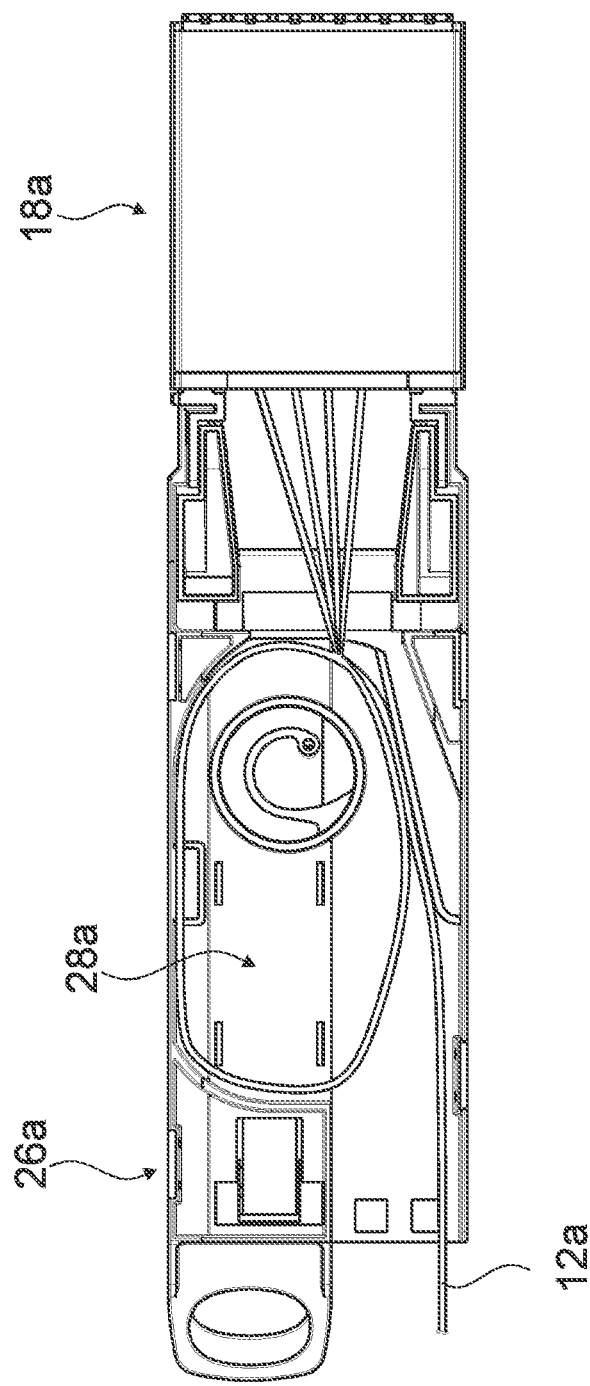
Figure 18B:
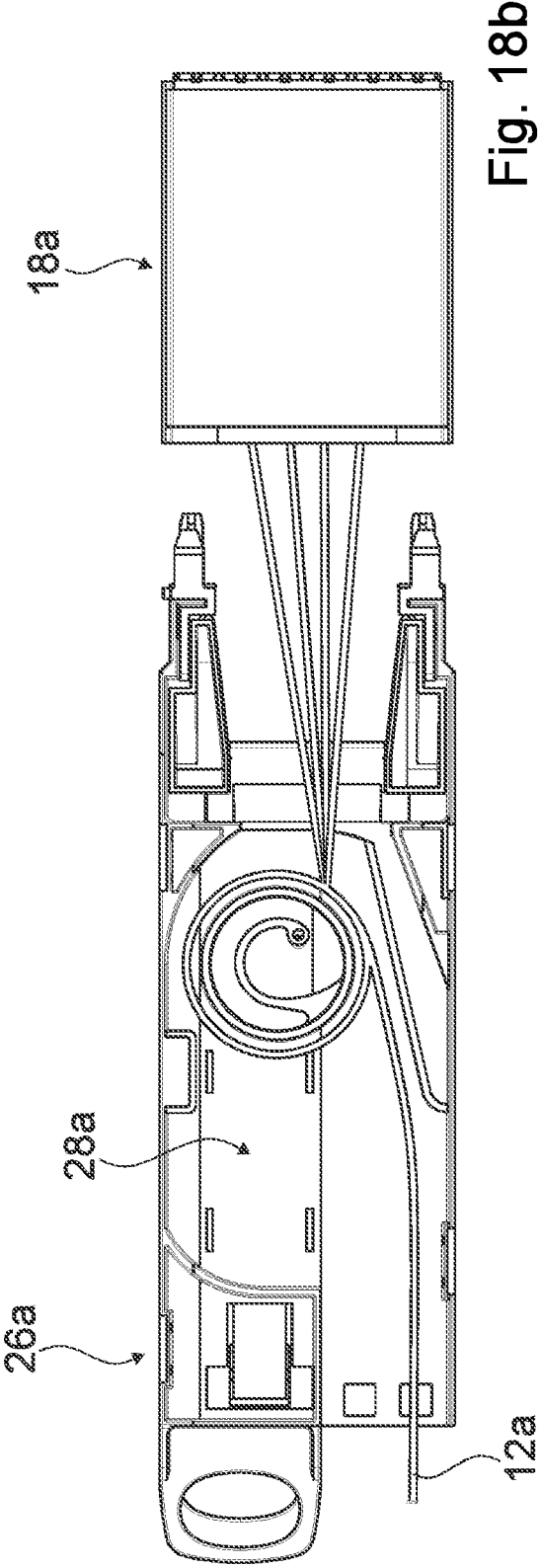
Figure 19A:
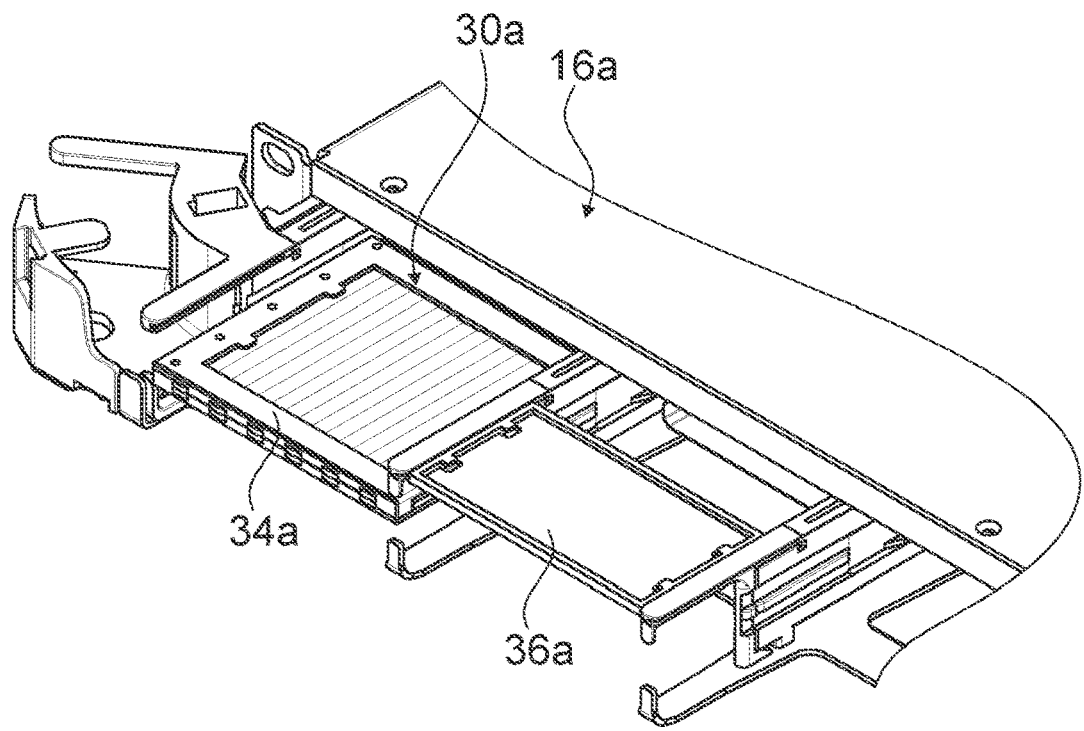
Figure 19B:
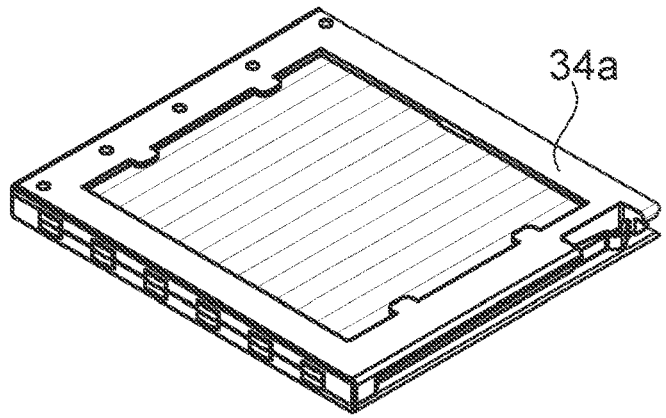
Figure 19C:
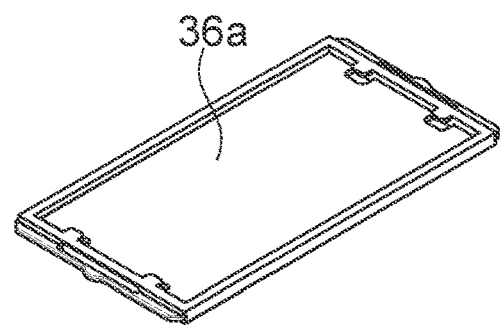
Figure 20A:
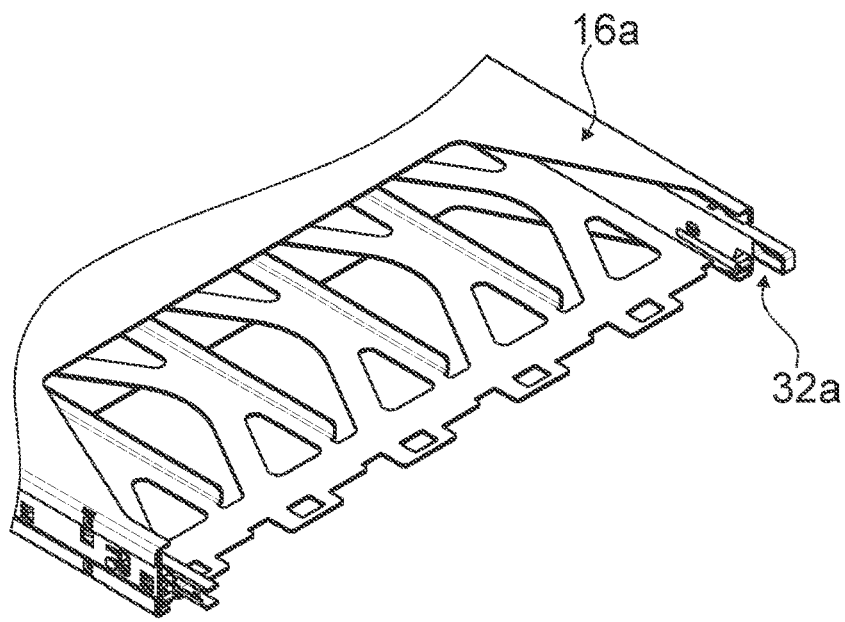
Figure 20B:
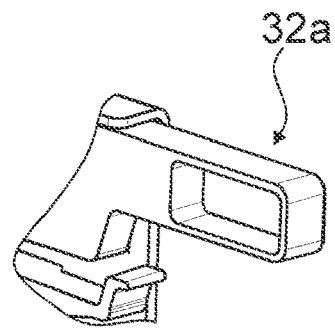
Figure 20C:
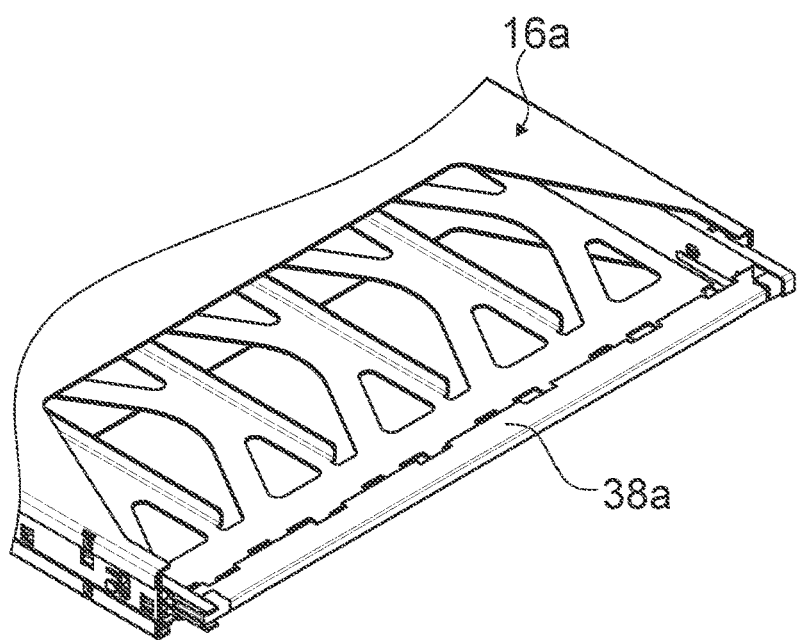
Figure 21A:
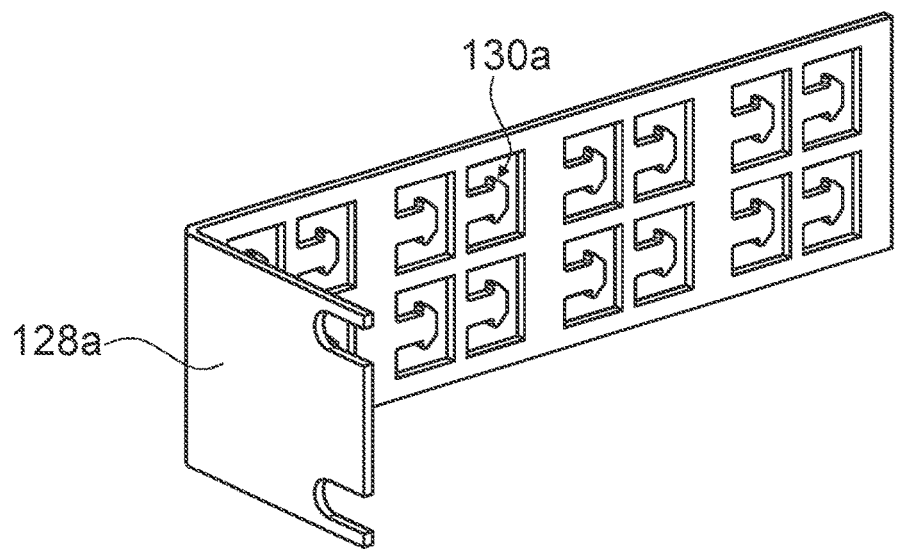
Figure 21B:
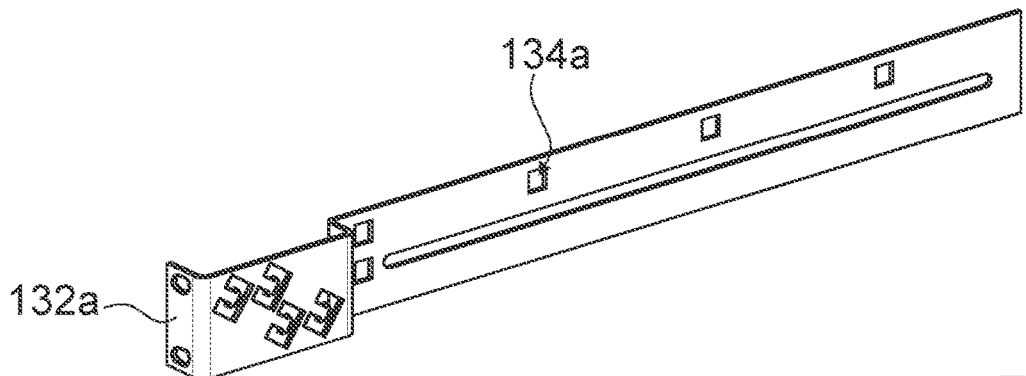
Figure 22:
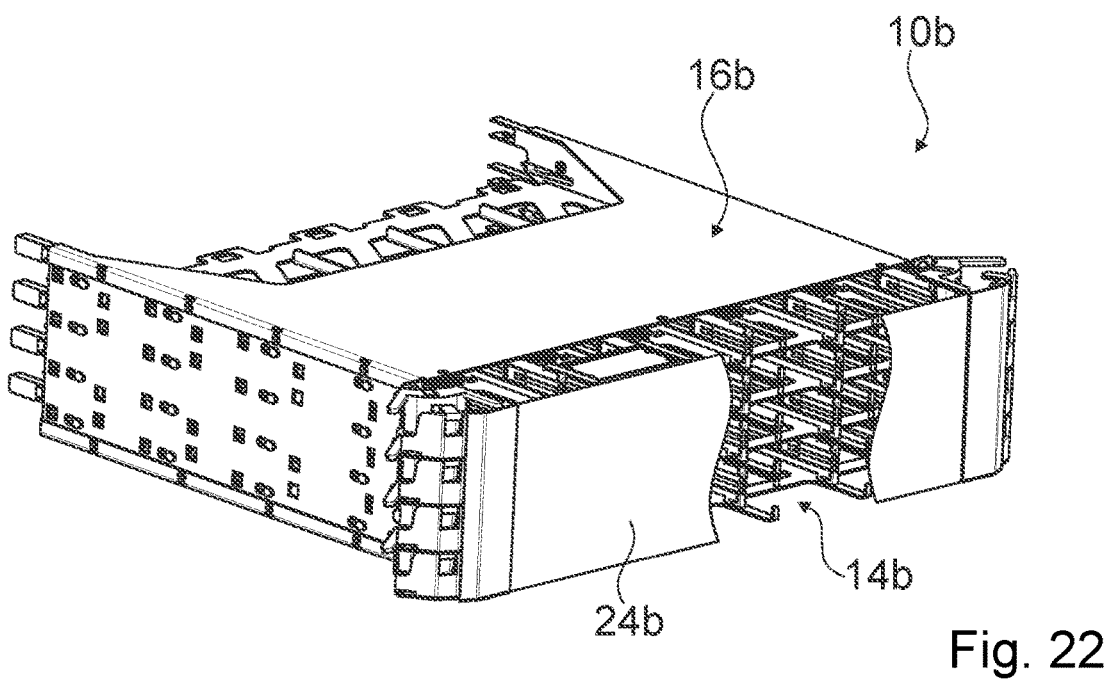
Figure 23:
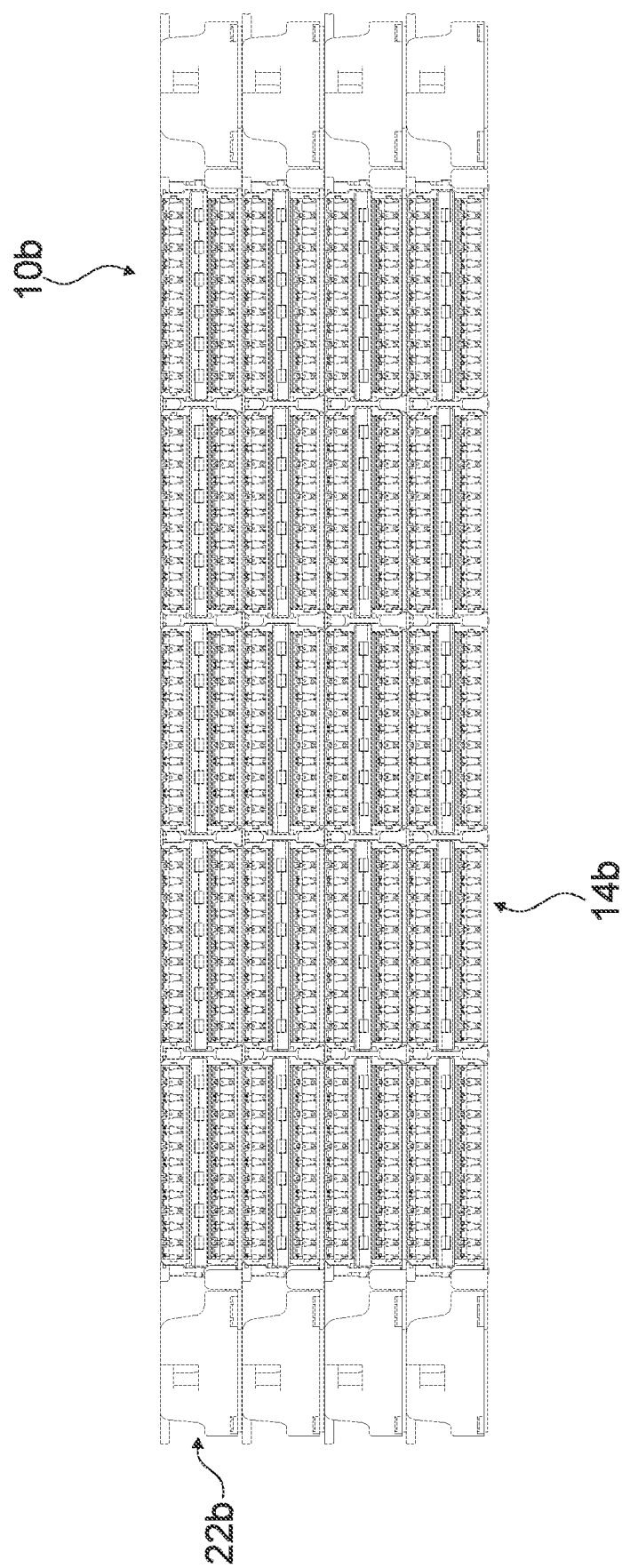
Figure 24:
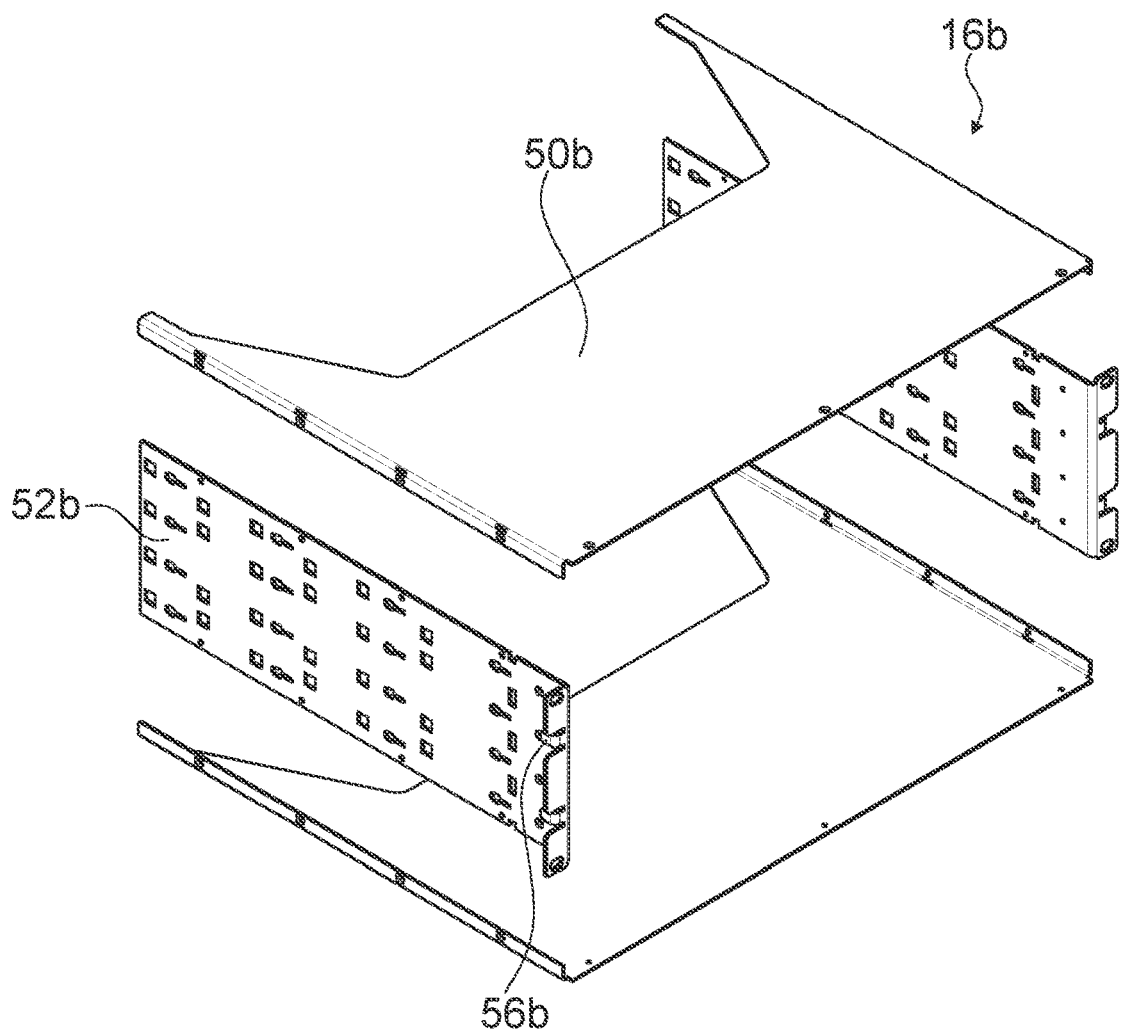
Figure 25A:
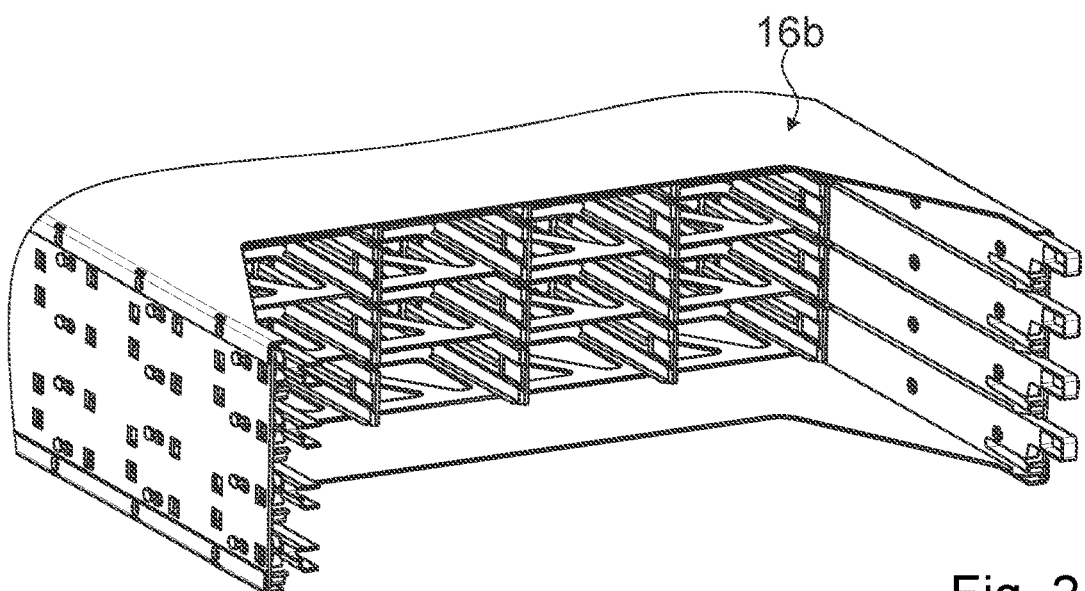
Figure 25B:
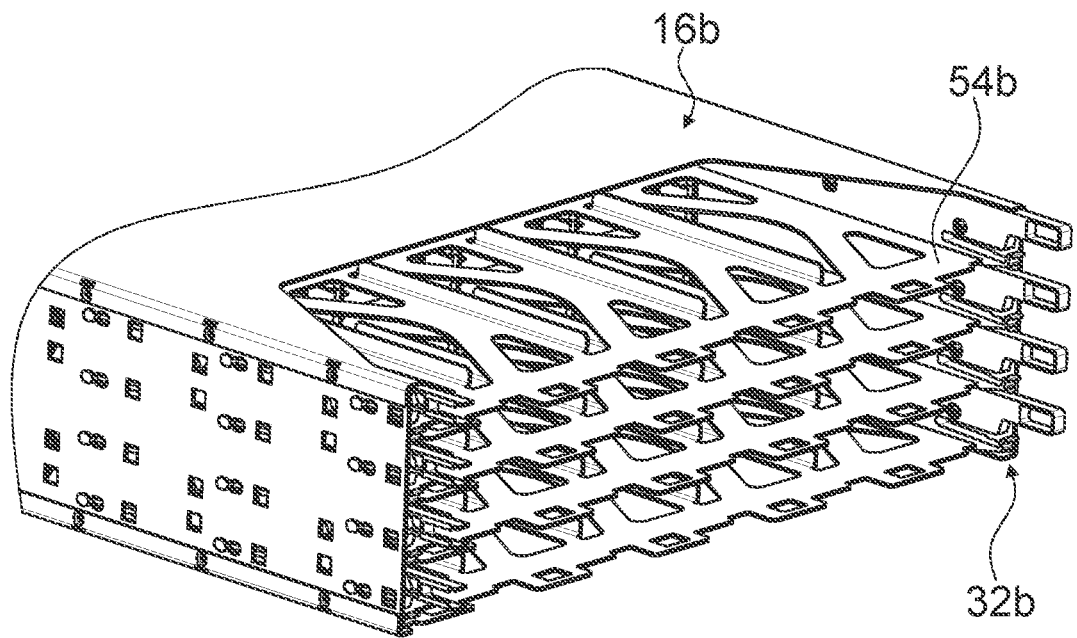
Figure 25C:
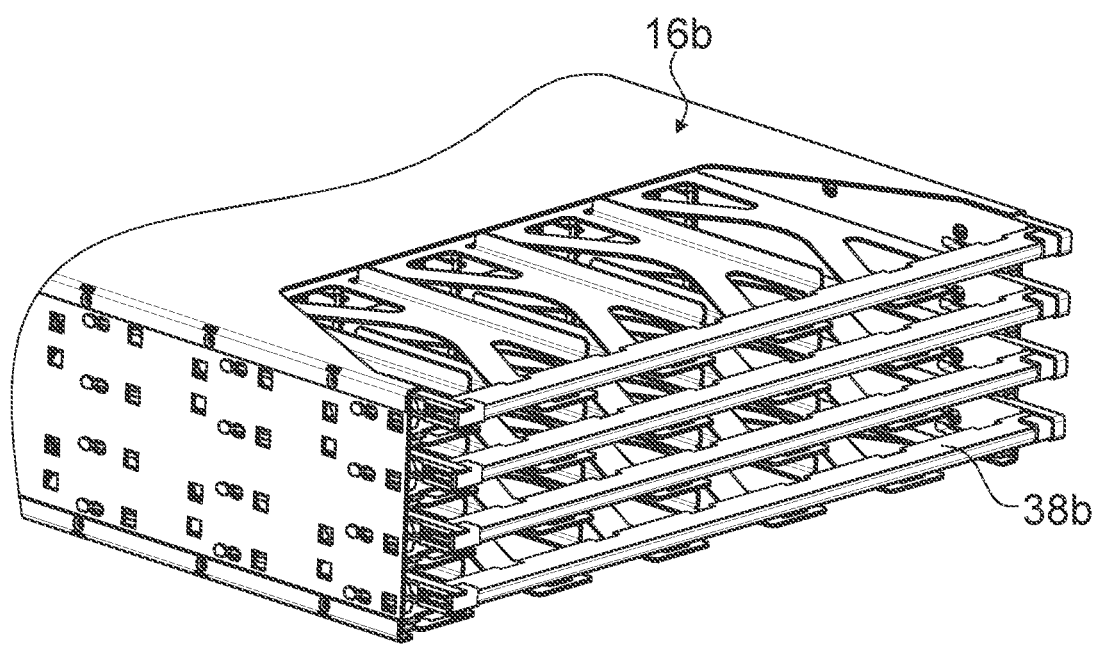
Figure 26:
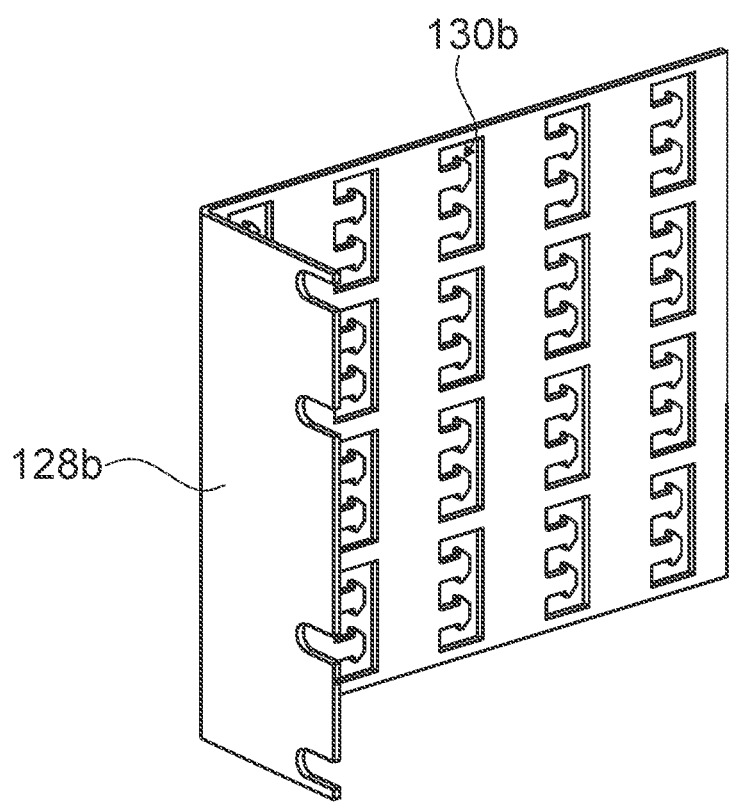
Figure 27:
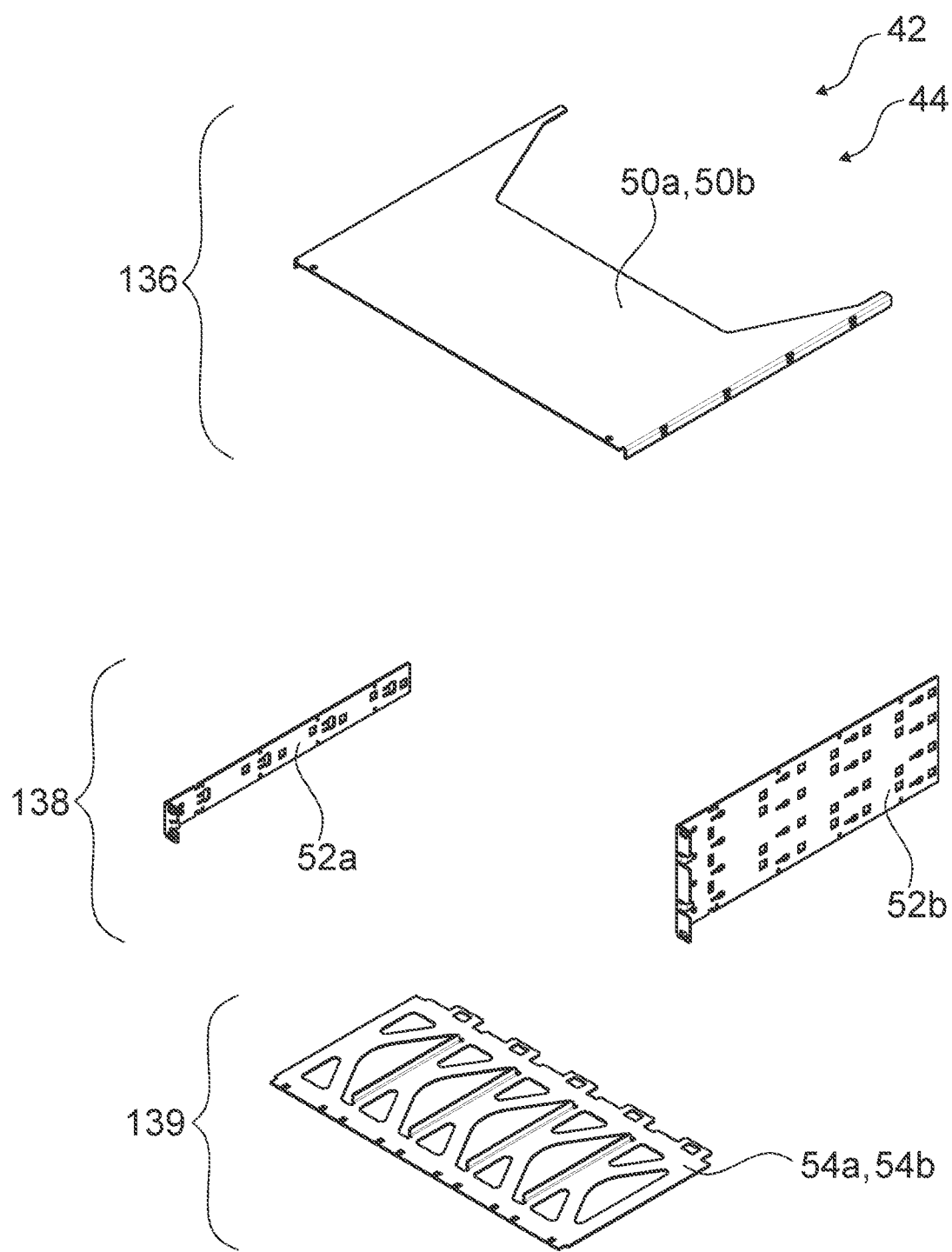
Figure 28:
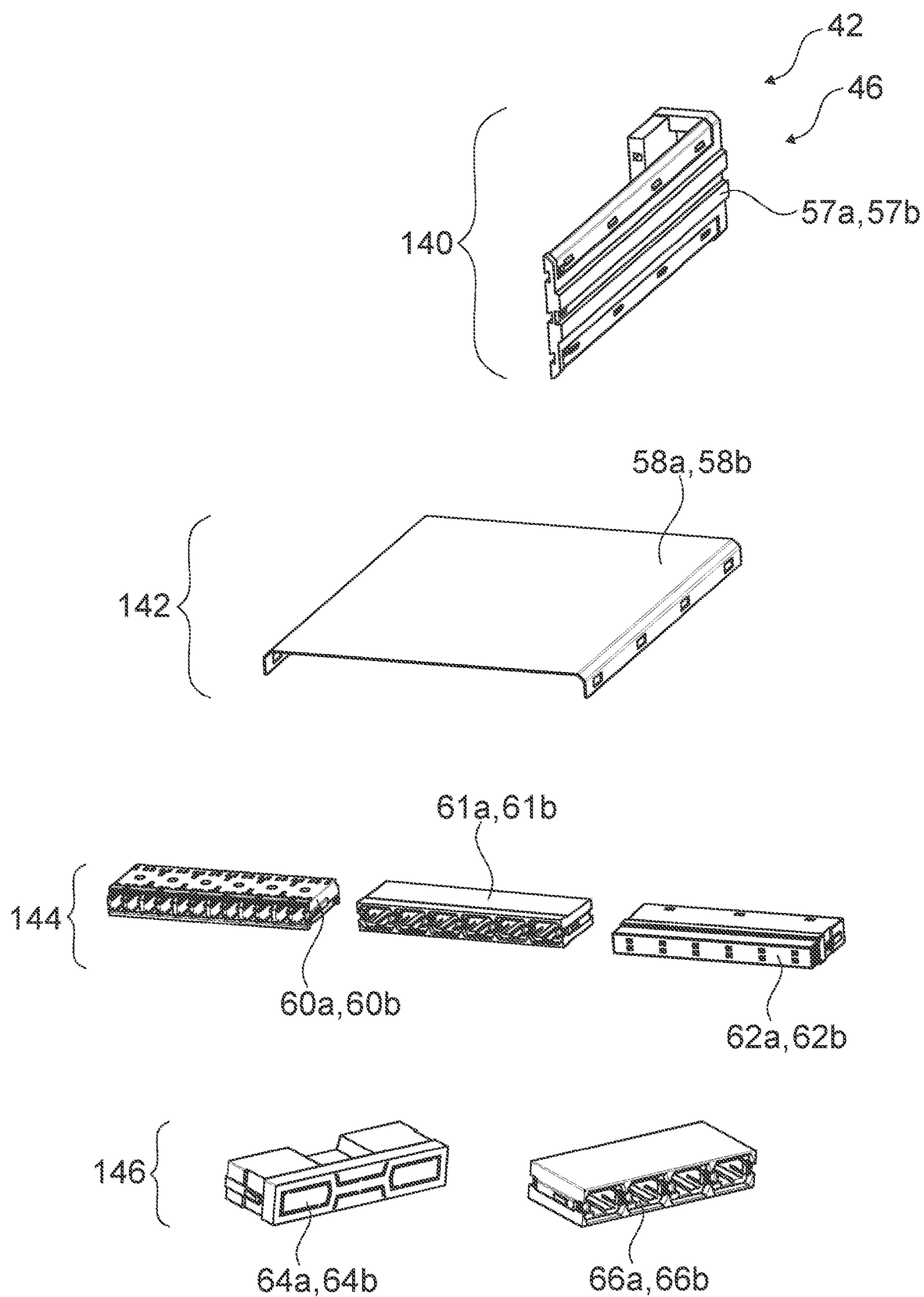
Figure 29:
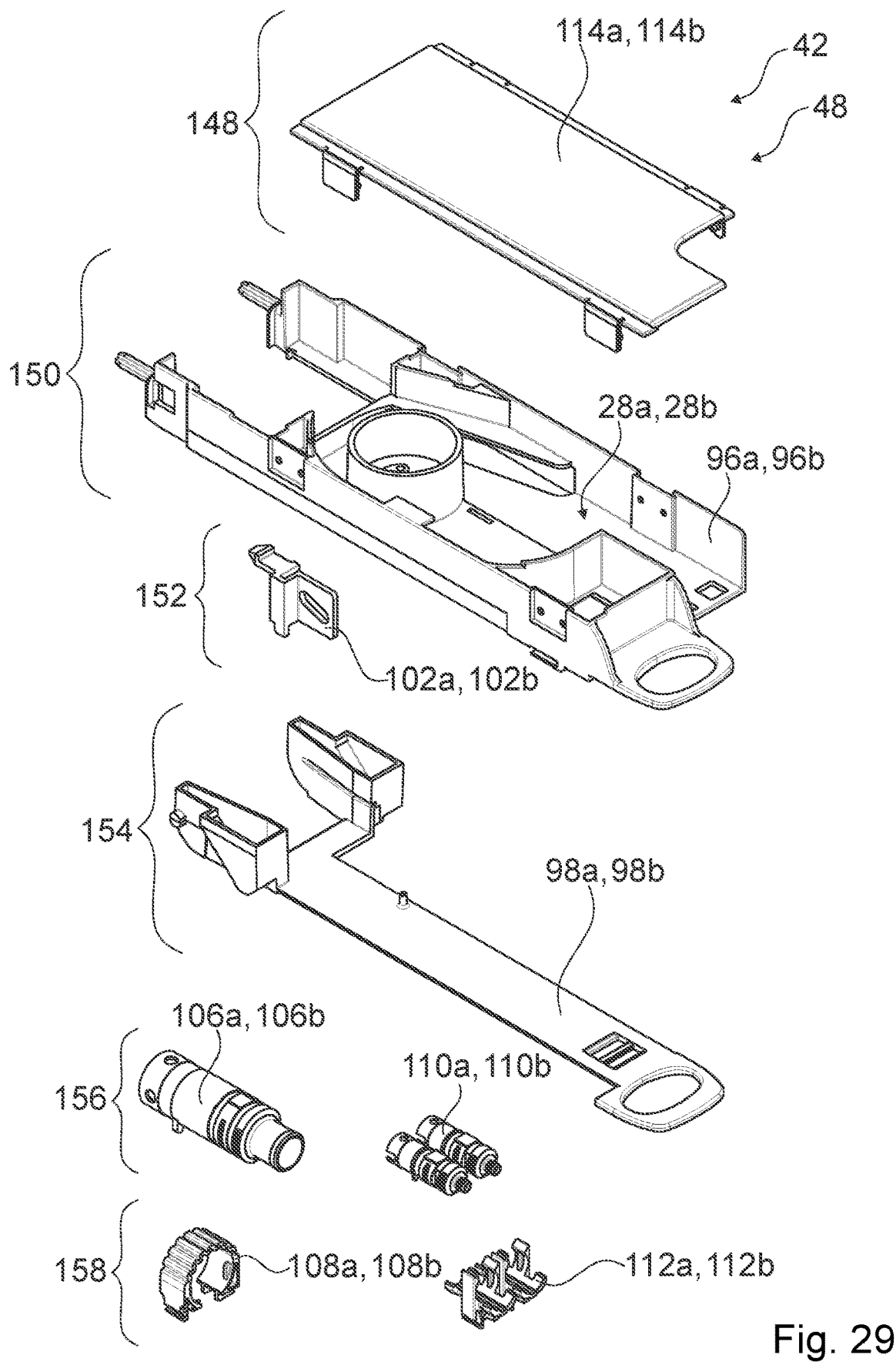

It is shown in:

FIG. 1a-b a portion of a patch panel with a patch bay device, which comprises a fully mounted connection unit in a first operating state, in different perspective views, FIG. 2a-c the fully mounted connection unit in a second operating state, in various perspective views, FIG. 3a-b a frame unit of the connection unit, in various views, FIG. 4a-e a connection module and a further connection module of the connection unit, in various perspective views, FIG. 5a-b a cover element of the connection unit, in various perspective views, FIG. 6a-c a module holder and/or a portion of a module holder of the connection unit, in various perspective views, FIG. 7a-b the module holder in the first operating state and in the second operating state, FIG. 8a-b a representation of a front-side mounting of the connection module in the module holder, FIG. 9 a representation of a cover element mounted in the module holder, FIG. 10 a front side of a fully loaded connection unit, FIG. 11a-e parts of a front-side cable manager unit of the connection unit and fastening possibilities of the parts of the front-side cable manager unit, in various perspective views, FIG. 12a-c alternative fastening possibilities of the parts of the front-side cable manager unit, in various perspective views, FIG. 13a-c a rear-side cable manager unit of the connection unit, in various perspective views, FIG. 14a-c a cable component and a corresponding component holder of the rear-side cable manager unit, in various perspective views, FIG. 15a-c a further cable component and a corresponding further component holder of the rear-side cable manager unit, in various perspective views, FIG. 16a-f a representation of a coupling process for a mounting of the connection module in the module holder from the rear, FIG. 17a-b a representation of an unlocking unit of the rear-side cable manager unit for mounting the rear-side cable manager unit, FIG. 18a-b a representation of a movement of the connection module in the module holder and of a corresponding movement of a cable that is arranged in a cable overlength receiving region of the rear-side cable manager unit, FIG. 19a-c a functional unit receiving zone arranged in a front-side region of the connection unit and functional units of the connection unit, in various perspective views, FIG. 20a-c a further functional unit receiving zone arranged in a rear-side region of the connection unit and a further functional unit of the connection unit, in various perspective views, FIG. 21a-b two different fastening elements of the patch bay device for a fastening of the connection unit from the rear, in perspective views, FIG. 22 a connection unit of a further patch bay device, in a perspective view, FIG. 23 a front side of a fully loaded connection unit of FIG. 22, FIG. 24 a frame unit of the connection unit of FIG. 22, in an exploded view, FIG. 25a-c further functional unit receiving regions arranged in a rear-side region of the connection unit of FIG. 22 and further functional units of the connection unit of FIG. 22, in various perspective views, FIG. 26 a fastening element of the further patch bay device of FIG. 22 for a fastening of the connection unit of FIG. 22 from the rear, in a perspective view, FIG. 27 a first construction kit of a construction kit system for making the patch bay device of FIG. 1 and the further patch bay device of FIG. 22, FIG. 28 a second construction kit of the construction kit system for making the patch bay device of FIG. 1 and the further patch bay device of FIG. 22, and FIG. 29 a third construction kit of the construction kit system for making the patch bay device of FIG. 1 and of the further patch bay device of FIG. 22.

DESCRIPTION OF THE EXEMPLARY EMBODIMENTS

FIGS. 1a to 2c show at least a portion of a patch panel 40a in different operating states, in particular in a stowage position (cf. FIGS. 1a and 1b) and in a processing position (cf. FIGS. 2a to 2c), and in various perspective views. The patch panel 40a is configured for managing cables which are embodied as optical waveguide cables. The patch panel 40a is in this case intended to be used in a carrier unit (not shown), in the present case in particular in a 19-inch rack, in particular a 19-inch standard rack, and may in particular also comprise the carrier unit. Principally, however, it is also conceivable to implement a carrier unit as any other type of carrier unit, advantageously as any other rack, and/or to use cables that differ from optical waveguide cables, e.g. electric cables.

The patch panel 40a comprises a patch bay device. The patch bay device comprises at least one connection unit 10a. The connection unit 10a is embodied as a cable management unit. The connection unit 10a is in the present case embodied as a 19-inch insert. Furthermore the connection unit 10a has in the present case a height of 1 U and/or 44.45 mm. Alternatively, it is however also conceivable to implement a connection unit, for example, as a 10-inch insert, as a 21-inch insert and/or as a 24-inch insert. Moreover a connection unit could have a height of 2 U, 3 U, 4 U and/or any other height. The connection unit 10a defines a plurality of ports that are in particular standardized and/or normalized. Each port is herein configured to optionally receive a panel plug connector element, in particular a standardized and/or normalized panel plug connector element, in particular for a device-side connection, and/or to receive at least a portion of an, in particular standardized and/or normalized, function monitoring unit. In the present case the connection unit 10a has in a connection zone 14a a port density, in particular a number of in particular standardized and/or normalized ports, of 0.58 ports/cm². The connection zone 14a is herein arranged at a front side of the connection unit 10a. In the present case the connection zone 14a corresponds to a substantially entire front region of the connection unit 10a. The connection unit 10a thus comprises in the present case a connection zone 14a having a port density of 120 ports/U.

In particular for the purpose of achieving this, the connection unit 10a comprises a frame unit 16a (cf. also FIGS. 3a and 3b). The frame unit 16a is embodied as a chassis. The frame unit 16a forms in the present case an outer housing of the connection unit 10a. The frame unit 16a consists in the present case of metal, in particular of at least one metal sheet. The frame unit 16a comprises two cover plates 50a.

The cover plates 50a are embodied at least substantially identical to each other. The cover plates 50a are respectively embodied at least substantially rectangular, in particular if viewed perpendicularly to a main extension plane of the cover plates 50a, with a rear-side recess. One cover plate 50a of the cover plates 50a embodies and/or defines an underside of the frame unit 16a and/or of the connection unit 10a. A further cover plate 50a of the cover plates 50a embodies and/or defines an upper side of the frame unit 16a and/or of the connection unit 10a. The cover plates 10a thus delimit the height of the frame unit 16a and/or of the connection unit 10a.

The frame unit 16a further comprises two lateral walls 52a. The lateral walls 52a are embodied at least substantially identical to each other. The lateral walls 52a are embodied at least substantially rectangular, in particular if viewed perpendicularly to a main extension plane of the lateral walls 52a. The lateral walls 52a are embodied at least substantially L-shaped. A long side of the L-shape embodies and/or defines herein a side of the frame unit 16a and/or of the connection unit 10a. A short side of the L-shape defines a fastening section, in particular for a front-side fastening of the frame unit 16a and/or of the connection unit 10a to the carrier unit. The lateral walls 52a thus delimit a width of the frame unit 16a and/or of the connection unit 10a. Beyond this, each lateral wall 52a comprises at least one auxiliary fastening element 56a (cf. in particular FIG. 3b). The auxiliary fastening elements 56a are arranged at the short side of the L-shape. The auxiliary fastening elements 56a are embodied at least substantially lug-shaped and/or tongue-shaped. The auxiliary fastening elements 56a are configured to simplify a fastening of the frame unit 16a and/or of the connection unit 10a to the carrier unit. The auxiliary fastening elements 56a are configured to at least temporarily receive and transfer to the carrier unit a weight force of the connection unit 10a. The auxiliary fastening elements 56a are herein embodied corresponding to fastening recesses of the carrier unit. Alternatively it is, however, also conceivable to dispense with auxiliary fastening elements.

Furthermore the frame unit 16a comprises at least one holding plate 54a. The holding plate 54a is embodied at least substantially rectangular, in particular if viewed perpendicularly to a main extension plane of the holding plate 54a. The holding plate 54a is arranged in a rear side region of the connection unit 10a. The holding plate 54a is arranged in a region of the rear-side recesses of the cover plates 50a. The holding plate 54a is herein, if viewed perpendicularly to the main extension plane of the cover plates 50a, arranged between the cover plates 50a at least to a large part. Moreover the holding plate 54a is arranged in a proximity of the underside of the frame unit 16a and/or connection unit 10a. The holding plate 54a is at least substantially adapted to a shape and/or contour, in particular to the width, of the frame unit 16a and/or of the connection unit 10a. The holding plate 54a is configured to receive at least one structural element of the connection unit 10a, in particular in a systematic and/or guided fashion. The cover plates 50a, the lateral walls 52a and the holding plate 54a can be coupled to each other by way of any fastening method. In the present case the cover plates 50a, the lateral walls 52a and the holding plate 54a are at least partially connected to each other by means of screw connections. The cover plates 50a, the lateral walls 52a and the holding plate 54a define a receiving space, in the present case in particular at least for receiving at least one connection module 18a, 19a.

Moreover the frame unit 16a has a modular structure. The cover plates 50a, the lateral walls 52a and the holding plate 54a are herein selectable from a group 136, 138, 139 of cover plates 50a, lateral walls 52a and/or holding plates 54a, depending on a width and/or a height of the frame unit 16a and/or of the connection unit 10a. In the present case, at least the height of the frame unit 16a and/or of the connection unit 10a is at least substantially selectable according to requirements. The height may herein correspond to, in particular, 1*U, 2*U, 3*U, 4*U and/or any other height. Accordingly the connection unit 10a has in the present case a modular structure and may, in particular, be varied at least as regards its height.

The connection unit 10a further comprises at least one connection module 18a, 19a, which is in particular arranged in the receiving space of the frame unit 16a (cf. in particular FIGS. 4a to 4e). At the least one connection module 18a, 19a is designed to provide at least one of the ports. The at least one port is herein arranged on a side of the at least one connection module 18a, 19a, which in particular, faces the front side of the connection unit 10a. In the present case the connection unit 10a may comprise, in particular optionally, a plurality of connection modules 18a, 19a, in particular up to five connection modules 18a, 19a, in particular of the same type. Each of the connection modules 18a, 19a is herein, with respect to the frame unit 16a, releasable, connectable and/or replaceable individually and independently from the other connection modules 18a, 19a. The connection modules 18a, 19a are moreover at least substantially structurally identical to each other. Furthermore the connection modules 18a, 19a have a modular structure. FIGS. 4a to 4e herein show, to give examples, two connection modules 18a, 19a having different modular structures.

In the following a structure of a connection module 18a of the connection modules 18a, 19a is described in detail, wherein, in particular due to the at least to a large part structurally identical construction of the connection modules 18a, 19a, the following description may also be applied to the further connection module 19a and/or further connection modules 18a, 19a.

In the present case, the connection module 18a is made of a plastic material. Alternatively it is, however, also conceivable to manufacture a connection module 18a at least partially, at least to a large part and/or entirely of a material that differs from a plastic, e.g. a metal and/or a composite material. The connection module 18a comprises two module walls 57a. The module walls 57a are embodied as lateral walls. Main extension planes of the module walls 57a are herein oriented, in a mounted state, at least substantially parallel to main extension planes of the lateral walls 52a. The module walls 57a are embodied at least substantially identical to each other. The module walls 57a are embodied at least substantially rectangular, in particular if viewed perpendicularly to a main extension plane of the module walls 57a. The module walls 57a are embodied at least substantially L-shaped. Herein a long side of the L-shape forms and/or defines a side of the connection module 18a. The module walls 57a thus delimit a width of the connection module 18a. The connection module 18a has a width of maximally a fifth of the width of the connection unit 10a. In the present case the connection module 18a has a width of approximately 8 cm to 8.5 cm. Moreover the module walls 57a define a height of the connection module 18a. In the present case the connection module 18a has a height of approximately 3.33 cm and/or 0.75 U. Furthermore a short side of the L-shape respectively defines a coupling section of the connection module 18a. The coupling section comprises at least one first module coupling element 67a and at least one second module coupling element 69a. The module coupling elements 67a, 69a are configured for in particular optionally coupling with at least one structural element of the connection unit 10a. Alternatively it is, however, also conceivable that a connection module comprises no coupling section and/or no module coupling elements. Moreover a connection module could comprise precisely one module coupling element.

Furthermore the connection module 18a comprises two module covers 58a. The module covers 58a are embodied at least substantially identical to each other. The module covers 58a are each embodied at least substantially rectangular, in particular if viewed perpendicularly to a main extension plane of the module covers 58a. The module covers 58a are at least substantially plate-shaped. One module cover 58a of the module covers 58a forms and/or defines an underside of the connection module 18a. A further module cover 58a of the module covers 58a forms and/or defines an upper side of the connection module 18a. The module covers 58a thus delimit the height of the connection module 18a. The module covers 58a can be coupled to the module walls 57a by any fastening method, according to requirements. In the present case the module covers 58a are connected to the module walls 57a by means of a latch connection. Alternatively it is, however, also conceivable to dispense with at least one module cover and/or to completely dispense with module covers. In this case, a connection module in particular implements an advantageously accessible module cassette.

The module walls 57a and advantageously the module covers 58a define a module housing of the connection module 18a. Moreover the module walls 57a and advantageously the module covers 58a define a cable receiving region as well as a front side connection zone, which is in particular arranged on a side that faces away from the short side of the L-shape of the connection module 18a, and a rear-side receiving region.

In the present case the connection module 18a makes exactly 18 ports available, in particular in the front-side connection zone. The 18 ports are arranged in precisely three rows, in particular with respect to a height of the connection module 18a, which corresponds in particular to six ports per row. Each port of the connection module 18a is configured to receive a panel plug connector element and/or a sixth of a function monitoring unit.

In particular for the purpose of simplifying a mounting of panel plug connector elements into the connection modules 18a, 19a, six panel plug connector elements are in the present case combined into a front-side module element 60a, 61a. A first front-side module element 60a of the module elements 60a, 61a comprises six panel plug connector elements, each for connecting a duplex plug connector element, in the present case in particular an LC-Duplex plug connector element. Furthermore a second front-side module element 61a of the module elements 60a, 61a comprises six panel plug connector elements, each for connecting a multi-fiber plug connector element, in the present case in particular an MPO plug connector element (cf. also FIG. 28). Moreover the function monitoring unit implements an—in particular third—front-side module element 62a. It is further conceivable to provide further front-side module elements, for example for connecting simplex plug connector elements and/or for connecting further functional units.

In the present case the connection modules 18a, 19a comprise the front-side module elements 60a, 61a, 62a, which are in particular of the same type. The front-side module elements 60a, 61a, 62a herein are at least substantially structurally identical. The front-side module elements 60a, 61a, 62a occupy exactly one row, in particular row of ports, of the connection modules 18a, 19a. The front-side module elements 60a, 61a, 62a can be coupled to the module walls 57a and/or to the module covers 58a by any fastening method. In the present case the front-side module elements 60a, 61a, 62a are connected to the module walls 57a by way of a dovetail connection. The front-side module elements 60a, 61a, 62a are herein selectable from a group 144 of front-side module elements 60a, 61a, 62a, depending on an application purpose of the connection modules 18a, 19a. Thus in the present case at least one connection type of the connection modules 18a, 19a is freely selectable. Moreover the connection unit 10a has a modular structure.

Beyond this the connection modules 18a, 19a comprise in the present case, in particular additionally, rear-side module elements 64a, 66a, in particular of the same type. The rear-side module elements 64a, 66a are arranged in the rear-side receiving region. The rear-side module elements 64a, 66a are configured to at least partially conduct cables that are fed to the rear-side receiving region. The rear-side module elements 64a, 66a herein have at least substantially an identical structure. The rear-side module elements 64a, 66a occupy exactly one row of the connection modules 18a, 19a, in particular analogously to the front-side module elements 60a, 61a, 62a. The rear-side module elements 64a, 66a are herein couplable to the module walls 57a and/or to the module covers 58a by any fastening method. In the present case the rear-side module elements 64a, 66a are connected to the module walls 57a by way of a dovetail connection. The rear-side module elements 64a, 66a are herein selectable from a group 146 of rear-side module elements 64a, 66a, depending on an application purpose of the connection modules 18a, 19a and/or depending on a corresponding front-side module element 60a, 61a, 62a. Alternatively, however, it is also conceivable to completely dispense with rear-side module elements.

FIGS. 5a and 5b furthermore show an optionally usable cover element 68a of the connection unit 10a. The cover element 68a can in particular be used instead of a connection module 18a, 19a and is configured to protect the receiving space of the frame unit 16a.

In particular for the purpose of improving an accessibility of the connection modules 18a, 19a, the connection unit 10a comprises at least one module holder 20a (cf. in particular FIGS. 6a to 9). The module holder 20a is movable, in the present case in particular linearly movable, with respect to the frame unit 16a. The module holder 20a is herein movable, in particular in drawer-fashion, from a stowage position (cf. in particular FIGS. 1a and 1b) into an operative position (cf. in particular FIGS. 2a to 2c) and vice versa.

The module holder 20a comprises at least one support plate 72a. The support plate 72a is in the present case made of metal, in particular of a metal sheet. The support plate 72a is embodied at least substantially plate-shaped. The support plate 72a is embodied at least substantially rectangular, in particular if viewed perpendicularly to a main extension plane of the support plate 72a. The support plate 72a is movable with respect to the frame unit 16a. The support plate 72a is arranged in a front-side region of the connection unit 10a. Herein the support plate 72a is arranged, if viewed perpendicularly to a main extension plane of the cover plates 50a, at least to a large part between the cover plates 50a. The support plate 72a is adapted at least substantially to a shape and/or contour, in particular to the width of the frame unit 16a and/or of the connection unit 10a. Moreover the support plate 72a is arranged in a proximity of the underside of the frame unit 16a and/or of the connection unit 10a.

The module holder 20a further comprises a plurality of support walls 74a (cf. in particular FIGS. 6b and 6c). In the present case the module holder 20a comprises precisely six support walls 74a. The support walls 74a are made of metal. The support walls 74a are furthermore movable with respect to the frame unit 16a. The support walls 74a are embodied at least substantially rectangular, in particular if viewed perpendicularly to a main extension plane of the support walls 74a. The support walls 74a are implemented as lateral walls. Main extension planes of the support walls 74a are arranged in parallel to each other. Moreover the main extension planes of the support walls 74a are in a mounted state oriented at least substantially in parallel to main extension planes of the lateral walls 52a and/or of the module walls 57a. Furthermore the support walls 74a are embodied at least substantially identical to each other. The support walls 74a are arranged at least to a large part in the front-side region of the connection unit 10a. Herein the support walls 74a are arranged, if viewed perpendicularly to the main extension plane of the cover plates 50a, at least to a large part between the cover plates 50a. The support walls 74a are at least substantially adapted to the height of the connection modules 18a, 19a. Furthermore a distance between the support walls 74a corresponds at least substantially to a width of the connection modules 18a, 19a. The support plate 72a and respectively two of the support walls 74a define a module receiving region, in particular for receiving one of the connection modules 18a, 19a.

The module holder 20a further comprises a release unit (cf. in particular FIGS. 7a and 7b). The release unit comprises two release elements 78a. The release elements 78a are at least substantially identical to each other. The release elements 78a are fixedly connected to at least one structural element of the module holder 20a, in the present case in particular to the support plate 72a. The release elements 78a are respectively arranged in a proximity of the mutually opposite-situated lateral walls 52a of the frame unit 16a. Herein the release elements 78a are respectively embodied as a thrust rod. The release elements 78a each comprise an actuation element 80a. The actuation elements 80a are respectively arranged on a side of the release element 78a that faces the front side of the connection unit 10a and/or on a side of the release element 78a that faces towards a user and/or operator. Furthermore, each of the release elements 78a comprises respectively one release latch element 82a. The release latch elements 82a are respectively arranged on a side of the release element 78a facing away from the front side of the connection unit 10a and/or on a side of the release element 78a that faces away from a user and/or operator. The release elements 78a are supported in such a way that they are pivotable and/or rotatable relative to the support plate 72a. In the stowage position the release latch elements 82a engage in holding deepenings 84a of the lateral walls 52a of the frame unit 16a, thereby in particular securing the module holder 20a in the stowage position (cf. in particular FIG. 7a). In the present case the release latch elements 82a are herein pressed into the holding deepenings 84a of the lateral walls 52a by means of an elastic reset element, e.g. a spring.

In order to move the module holder 20a from the stowage position into the processing position, first a safeguard implemented by the release elements 78a must be released. To this purpose the actuation elements 80a are, in particular simultaneously, loaded with a force directed toward the lateral walls 52a, resulting in the release latch elements 82a pivoting, in particular counter to the spring-elastic reset force of the reset element, out of the holding deepenings 84a of the lateral walls 52a and in particular the safeguard being released, and allowing the module holder 20a to be moved into the processing position (cf. in particular FIG. 7b). If the module holder 20a is then moved back into the stowage position, the release latch elements 82a are pivoted automatically back into the holding deepenings 84a of the lateral walls 52a by the spring-elastic reset force of the reset element. Alternatively it is, however, also conceivable that release elements are supported in such a way that they are linearly movable relative to a support plate, actuation elements being therefore loaded, in particular by way of a force directed in a movement direction of a module holder, for a release.

In the present case the module holder 20a is configured to receive up to five of the connection modules 18a, 19a at the same time and in particular one beside the other. The connection modules 18a, 19a are introducible into the module holder 20a optionally from the front and/or from the rear for assembly and are removable out of the module holder 20a optionally from the front and/or from the rear for disassembly. FIGS. 8a and 8b show, as an example, a front-side mounting of one of the connection modules 18a, 19a by means of a linear movement. In a completely inserted state the connection modules 18a, 19a are held in the respective module receiving region by a latch connection. For this purpose a support wall 74a allocated to the respective module receiving region comprises at least one latch element 76a. The latch element 76a is in the present case configured to prevent a forward movement of the connection module 18a, 19a. Moreover the support wall 74a may comprise further latch elements 75a and/or abutting elements, which may be configured to prevent a rearward movement of the connection module 18a, 19a. In the present case the support wall 74a comprises at least one further latch element 75a, which is in particular configured to prevent a rearward movement of the connection module 18a, 19a. On account of this the module holder 20a is configured to receive the connection modules 18a, 19a in a motionally rigid fashion and in particular to support them in a motionally rigid fashion. Accordingly a movement of the module holder 20a results in a simultaneous, uniform movement of a connection module 18a, 19a that is arranged in the module holder 20a. As the height of the frame unit 16a is in the present case 1·U, and the height of the connection modules 18a, 19a is 0.75·U, the connection unit 10a furthermore comprises in the present case a masking screen 70a. The masking screen 70a is configured to cover a gap that results from the differing heights of the frame unit 16a and the connection modules 18a, 19a. Alternatively, however, dispensing with a masking element is also conceivable.

FIG. 9 shows the alternatively usable masking element 68a of the connection unit 10a in a state when mounted in the module holder 20a.

FIG. 10 shows a view of the front side of the connection unit 10a in a fully loaded state. Herein the connection unit 10a comprises precisely one module holder 20a. The connection unit 10a is accordingly configured to receive up to five of the connection modules 18a, 19a simultaneously and in particular one beside the other. In particular as the height of the connection modules 18a, 19a is in the present case 0.75·U and one of the connection modules 18a, 19a has exactly 18 ports, the connection unit 10a has in the present case a connection zone 14a with a height of 0.75·U and exactly 90 ports, which in particular corresponds to a port density of 120 ports/U.

For the purpose of covering and/or protecting from touch the connection zone 14a in at least one operating state, in particular in a protection operating state, the connection unit 10a further comprises a protective element 24a (cf. in particular FIGS. 1a to 2c). The protective element 24a is arranged in the front-side region of the connection unit 10a. The protective element 24a is made of a plastic. The protective element 24a is embodied at least substantially rectangular, in particular if viewed perpendicularly to a main extension plane of the protective element 24a. The protective element 24a is herein embodied as a protective plate. The protective element 24a is at least substantially plate-shaped. The protective element 24a has a height that is adapted to the height of the frame unit 16a. Moreover the protective element 24a has a width that is adapted to the width of the frame unit 16a. Herein the protective element 24a is selectable from a group of protective elements 24a, depending on a width and/or a height of the frame unit 16a and/or of the connection unit 10a.

The protective element 24a is couplable to the module holder 20a. Herein the protective element 24a is connectable to and removable from the module holder 20a without tools and in particular in a non-destructive manner. The protective element 24a is thus connected to the module holder 20a in at least one operating state. Herein the protective element 24a is movable together with the module holder 20a uniformly and simultaneously. Beyond this the protective element 24a is pivotably supported, in particular by way of a hinge, in the present case in particular by way of a film hinge. The protective element 24a is herein supported in such a way that it is pivotable relative to the frame unit 16a about a pivot axis that extends in a direction of the width of the frame unit 16a. Furthermore the protective element 24a comprises a magnet lock 162a (cf. in particular FIG. 2c). The magnet lock 162a is configured to hold and/or fixate the protective element 24a in the protection operating state. The protective element 24a also comprises a sight region 164a. The sight region 164a is implemented at least substantially transparent. The sight region 164a extends at least substantially over an entire width of the frame unit 16a. The sight region 164a is configured to allow a view onto the connection zone 14a and/or onto the connection modules 18a, 19a.

Moreover, in case of such a high port density, as provided in particular by the connection zone 14a, an efficient cable management is required in particular for feeding cables in and/or out.

On account of this the connection unit 10a comprises at least one front-side cable manager unit 22a (cf. in particular FIGS. 11a to 12b). The front-side cable manager unit 22a is arranged in the front-side region of the connection unit 10a. The front-side cable manager unit 22a is configured to guide a plurality of cables and to convey them in at least one operating state to the connection zone 14a.

For this purpose the front-side cable manager unit 22a comprises at least one cable module 86a (cf. in particular FIGS. 11a and 11b). The cable module 86a is made of plastic. The cable module 86a is, if viewed perpendicularly to the main extension plane of the cover plates 50a, embodied at least substantially in the shape of an annulus sector. In the present case a central angle is, in particular, between 20° and 60°. The cable module 86a comprises moreover a cable guiding region that has at least substantially the shape of an open-cylinder surface. The cable guiding region is configured to maintain a minimum bending radius, which is in the present case in particular 25 mm. Furthermore the cable module 86a comprises at least one holding element 87a. In the present case the cable module 86a comprises three holding elements 87a. The holding elements 87a are embodied as holding fingers. The holding elements 87a at least partially close off the cable guiding region of the cable module 86a towards the top, in particular towards the upper side of the frame unit 16a. Beyond this, the cable module 86a comprises a fastening section 88a. The fastening section 88a is arranged on a side of the cable module 86a that faces away from the cable guiding region of the cable module 86a. The fastening section 88a comprises at least one cable module fastening element 166a. The cable module fastening element 166a is embodied as a connecting plate and/or as a connecting pin. The cable module fastening element 166a is configured for fastening the cable module 86a to the module holder 20a, in particular to one of the support walls 74a (cf. in particular FIG. 11d). The cable module fastening element 166a is configured to be connected to a cable manager fastening element 77a, in particular a receiving deepening, of one of the support walls 74a, that in particular corresponds to the cable module fastening element 166a. The cable module 86a is thus couplable to the module holder 20a. The cable module 86a is in the present case connectable to as well as removable from the module holder 20a without tools and in particular non-destructively. The cable module 86a is thus connected to the module holder 20a in at least one operating state. Herein the cable module 86a is movable together with the module holder 20a uniformly and simultaneously.

Alternatively to the above, the cable module 86a is couplable to a holding sheet 94a of the patch bay device (cf. in particular FIGS. 12a to 12c). For this purpose the fastening section 88a of the cable module 86a comprises an alternative cable module fastening element 168a. The alternative cable module fastening element 168a is embodied substantially different from the cable module fastening element 166a. The alternative cable module fastening element 168a is embodied as a latch element. The alternative cable module fastening element 168a is configured to be connected to a further alternative cable manager fastening element, in particular a latch element, of the holding sheet 94a, in particular a latch recess, which corresponds to the alternative cable module fastening element 168a. The cable module 86a is in this case removable from the holding sheet 94a by means of most simple tools, e.g. a screw-driver, and in particular non-destructively (cf. in particular FIG. 12c). The holding sheet 94a may be fixed, for example, to the frame unit 16a and/or to the carrier unit, as a result of which the cable module 86a is in particular immovable with respect to the module holder 20a. Alternatively, however, it is also conceivable to dispense with an alternative cable module fastening element.

In the present case the front-side cable manager unit 22a comprises two cable modules 86a. The cable modules 86a are at least substantially identical to each other. The cable modules 86a are in a mounted state respectively arranged in the proximity of the lateral walls 52a of the frame unit 16a which are situated opposite each other.

Furthermore the front-side cable manager unit 22a comprises at least one cable holder 90a (cf. in particular FIG. 11c). The cable holder 90a is made of plastic. The cable holder 90a is embodied at least substantially hook-shaped. The cable holder 90a herein comprises a further holding element 91a, which is in particular at least substantially finger-shaped. The further holding element 91a at least partially delimits a further cable guiding region. The further holding element 91a is configured to restrict a movement of a cable that is guided in the further cable guiding region towards the top, in particular towards the upper side of the frame unit 16a. The cable holder 90a moreover comprises a further fastening section 92a. The further fastening section 92a is arranged on a side of the cable holder 90a that faces away from the further cable guiding region of the cable holder 90a. The further fastening section 92a herein comprises at least one cable holder fastening element 170a. The cable holder fastening element 170a is embodied at least substantially identical to the cable module fastening element 166a of the cable module 86a. The cable holder fastening element 170a is embodied as a connecting plate and/or as a connecting pin. The cable holder fastening element 170a is configured for fastening the cable holder 90a to the module holder 20a, in particular to one of the support walls 74a (cf. in particular FIG. 11e). The cable holder fastening element 170a is configured to be connected to the cable manager fastening element 77a of one of the support walls 74a, which in particular corresponds to the cable module fastening element 166a and thus in particular also corresponds to the cable holder fastening element 170a.

Furthermore the further fastening section 92a comprises in the present case a further cable holder fastening element 172a. The further cable holder fastening element 172a is embodied as a connecting pin. The further cable holder fastening element 172a is configured for fastening the cable holder 90a to the module holder 20a, in particular to the support plate 72a. The further cable holder fastening element 172a is configured to be connected to a receiving deepening of the support plate 72a, which in particular corresponds to the further cable holder fastening element 172a. Alternatively, it is however also conceivable to dispense with a further cable holder fastening element.

The cable holder 90a is thus couplable to the module holder 20a. The cable holder 90a is in the present case connectable to and removable from the module holder 20a without tools and in particular non-destructively. The cable holder 90a is thus connected to the module holder 20a in at least one operating state. Herein the cable holder 90a is movable together with the module holder 20a uniformly and simultaneously.

In the present case the front-side cable manager unit 22a comprises four cable holders 90a. The cable holders 90a are at least substantially identical to each other. The cable holders 90a are in a mounted state respectively arranged at least substantially centrally in a region of the receiving space of the frame unit 16a. In the present case respectively one of the cable modules 86a or one of the cable holders 90a is allocated to each of the support walls 74a. Herein the cable modules 86a, the cable holders 90a and, in particular hook-shaped, cable holding elements 73a of the support plate 72a form together a cable guiding channel, which is configured for guiding cables and in particular for feeding the cables to the connection zone 14a (cf. also FIG. 6a). Alternatively, however, it is also conceivable to dispense with at least one cable module and/or at least one cable holder. Moreover a support plate could be free from cable holding elements. Beyond this, it is conceivable to entirely dispense with a front-side cable manager unit.

Moreover the connection unit 10a comprises at least one rear-side cable manager unit 26a (cf. in particular FIGS. 13a to 18b). The at least one rear-side cable manager unit 26a is herein allocated to precisely one of the connection modules 18a, 19a. In the present case the connection unit 10a thus comprises a plurality of rear-side cable manager units 26a, which are in particular allocated to respectively one of the connection modules 18a, 19a. The rear-side cable manager units 26a are in a mounted state arranged in the rear-side region of the connection unit 10a. In the present case the rear-side cable manager units 26a are in the mounted state supported and/or fixed on the holding plate 54a. Therefore the rear-side cable manager units 26a are in the mounted state immovable, in particular with respect to the module holder 20a, and are in particular connected to the frame unit 16a. The rear-side cable manager units 26a are respectively configured to guide a plurality of cables 12a and to feed them to one of the connection modules 18a, 19a in at least one operating state. The rear-side cable manager units 26a are herein at least substantially structurally identical to each other. In the present case the rear-side cable manager units 26a are at least substantially identical to each other. Alternatively, however, it is also conceivable that rear-side cable manager units differ in at least one feature from each other and/or to entirely dispense with at least one of the rear-side cable manager units 26a. It is herein in particular conceivable that a connection unit comprises exactly one rear-side cable manager unit and/or is completely free from rear-side cable manager units.

The following description will be restricted to one of the rear-side cable manager units 26a, in particular the rear-side cable manager unit 26a that is allocated to the connection module 18a, wherein due to the at least substantially identical construction and/or identical implementation of the rear-side cable manager units 26a, the following description may also be read on possible other rear-side cable manager units 26a.

FIGS. 13a to 13c show the rear-side cable manager unit 26a in an exploded view (cf. FIG. 13a) in an opened mounted state (cf. FIG. 13b) and in a closed mounted state (cf. FIG. 13c). The rear-side cable manager unit 26a comprises a first base body part 96a. The first base body part 96a is in the present case made of plastic. The first base body part 96a is embodied at least substantially rectangular-cuboid-shaped. The first base body part 96a is in a mounted state, if viewed perpendicularly to the main extension plane of the cover plates 50a, embodied at least substantially rectangular. The first base body part 96a is embodied in a one-part implementation. Alternatively, however, a first base body part could also be embodied in a multi-part implementation. The first base body part 96a has a width that is adapted to the width of the connection modules 18a, 19a. The first base body part 96a has a width of no more than a fifth of the width of the connection unit 10a. In the present case, the first base body part 96a has a width of approximately 8 cm to 8.5 cm. The first base body part 96a further has a height that is adapted to the height of the connection modules 18a, 19a. In the present case the first base body part 96a has a height of approximately 3.33 cm and/or 0.75*U. The first base body part 96a is embodied as a receiving housing. The first base body part 96a herein defines a cable overlength receiving region 28a. The cable overlength receiving region 28a is configured for receiving a cable overlength of at least one cable 12a fed to the connection module 18a. The cable overlength is herein required in particular due to a possible relative movement between the connection module 18a, which is in particular movable relative to the frame unit 16a, and the rear-side cable manager unit 26a, which is immovable in particular relative to the frame unit 16a. In the present case the cable overlength receiving region 28a is configured to receive a plurality of cables 12a, which are in particular configured to be fed to the connection module 18a. Herein a main extension length of the cable overlength receiving region 28a ranges between 80 mm and 150 mm. In the present case a main extension length of the cable overlength receiving region 28a is approximately 130 mm. Moreover the cable overlength receiving region 28a is configured to maintain a minimum bending radius of the cables 12a.

The first base body part 96a further comprises at least one first coupling element 104a. In the present case the first base body part 96a comprises two first coupling elements 104a. The first coupling elements 104a are at least substantially identical to each other. The first coupling elements 104a are embodied at least substantially bolt-shaped. With respect to the width of the first base body part 96a, the first coupling elements 104a are respectively arranged in a proximity of opposite sides of the first base body part 96a. The first coupling elements 104a are arranged on a front side of the first base body part 96a. Furthermore the first coupling elements 104a are arranged on a side of the first base body part 96a that faces towards the connection module 18a, in particular towards a rear side of the connection module 18a. The first coupling elements 104a are embodied correspondingly to first module coupling elements 67a of the connection module 18a.

Beyond this the first base body part 96a comprises a first handle element 100a. The first handle element 100a is arranged on a rear side of the first base body part 96a. The first handle element 100a is arranged on a side of the first base body part 96a that faces away from the front side of the connection unit 10a. Further the first handle element 100a is arranged on a side of the first base body part 96a that faces away from the connection module 18a.

The rear-side cable manager unit 26a also comprises a second base body part 98a. The second base body part 98a is in the present case made of a plastic. The second base body part 98a is embodied at least substantially rectangular, in particular if viewed perpendicularly to a main extension plane of the second base body part 98a. The second base body part 98a is embodied at least substantially plate-like and/or planar. The second base body part 98a is embodied at least substantially stripe-shaped. The second base body part 98a has a main extension length that is at least substantially adjusted to a main extension length of the first base body part 96a. The second base body part 98a furthermore has an average width that is substantially less than the width of the first base body part 96a.

The second base body part 98a moreover comprises at least one coupling element receiving space 99a. In the present case the second base body part 98a comprises two coupling element receiving spaces 99a. The coupling element receiving spaces 99a are at least substantially identical to each other. The coupling element receiving spaces 99a are arranged on a front side of the second base body part 98a. Furthermore the coupling element receiving spaces 99a are arranged on a side of the second base body part 98a that faces towards the connection module 18a, in particular towards the rear side of the connection module 18a.

The second base body part 98a also comprises a second handle element 101a. The second handle element 101a is arranged on a rear side of the second base body part 98a. The second handle element 101a is arranged on a side of the second base body part 98a that faces away from the front side of the connection unit 10a. Furthermore the second handle element 101a is arranged on a side of the second base body part 98a that faces away from the connection module 18a. The second handle element 101a is herein embodied correspondingly to the first handle element 100a.

The second base body part 98a is in a mounted state arranged on an underside of the first base body part 96a. The handle elements 100a, 101a are herein arranged one above the other and in particular embody together a handle region. In the present case the second base body part 98a and the first base body part 96a are furthermore in at least one operating state movable, in particular linearly movable, with respect to each other, in particular into a mounting and/or demounting direction of the rear-side cable manager unit 26a.

Furthermore the rear-side cable manager unit 26a comprises at least one second coupling element 102a. In the present case the rear-side cable manager unit 26a comprises two second coupling elements 102a. The second coupling elements 102a are at least substantially identical to each other. The second coupling elements 102a are embodied at least substantially hook-shaped. In a mounted state respectively one of the second coupling elements 102a is arranged, in particular movably arranged, in one of the coupling element receiving spaces 99a. The second coupling elements 102a are arranged in a region of the first coupling elements 104a. The second coupling elements 102a are embodied correspondingly to second module coupling elements 69a of the connection module 18a. The second coupling elements 102a are furthermore movably supported with respect to the second base body part 98a.

For an, in particular defined, movement of the second coupling elements 102a, the second base body part 98a comprises at least one guiding element 124a. In the present case the second base body part 98a comprises two guiding elements 124a, wherein respectively one of the guiding elements 124a is allocated to one of the second coupling elements 102a. The guiding elements 124a are embodied at least substantially bolt-shaped. The guiding elements 124a herein engage in a mounted state, in particular at least partially in a form-fit fashion, into guiding slots 103a, in particular guiding recesses, of the second coupling elements 102a.

The rear-side cable manager unit 26a further comprises a base body cover 114a. The base body cover 114a is embodied at least substantially rectangular, in particular if viewed perpendicularly to a main extension plane of the base body cover 114a. The base body cover 114a is at least substantially plate-shaped. The base body cover 114a forms and/or defines an upper side of the rear-side cable manager unit 26a. The base body cover 114a thus delimits the height of the rear-side cable manager unit 26a. The base body cover 114a is configured to close off the first base body part 96a and in particular the cable overlength receiving region 28a towards the top, in the mounted state in particular towards the upper side of the frame unit 16a. The base body cover 114a may herein be coupled to the first base body part 96a by way of any fastening method. In the present case the base body cover 114a comprises, for a connection to the first base body part 96a, a plurality of closure elements 115a, which are in particular pivotable by means of a film hinge. Alternatively, however, it is also conceivable to implement a base body cover in any other fashion and/or to totally dispense with a base body cover.

Furthermore the rear-side cable manager unit 26a has a modular structure. The rear-side cable manager unit 26a may herein comprise several different cable components 106a, 110a, e.g. stress relief elements and/or cable dividers, and/or several different component holders 108a, 112a (cf. in particular FIGS. 14a to 15c). The cable components 106a, 110a and/or the component holders 108a, 112a are selectable from a group 156, 158 of cable components 106a, 110a and/or of component holders 108a, 112a, depending on an intended application of the rear-side cable manager unit 26a, in particular depending on a cable type used and/or on an intended application of the connection module 18a.

The cable components 106a, 110a may, for example, be configured for avoiding pull tensions and/or for dividing up cables 12a fed into the cable overlength receiving region 28a. The component holders 108a, 112a are configured for holding the cable components 106a, 110a. Herein the component holders 108a, 112a are connectable to at least one in particular square holding recess 113a of the first base body part 96a, which is in particular standardized and/or normalized. In a mounted state the cable components 106a, 110a and the component holders 108a, 112a are arranged on the rear side of the first base body part 96a. Moreover the cable components 106a, 110a and the component holders 108a, 112a are arranged in a proximity of the handle region that is formed by the handle elements 100a, 101a.

FIGS. 14a to 14c herein show a first cable component 110a of the cable components 106a, 110a and a corresponding first component holder 112a of the component holders 108a, 112a. The first cable component 110a is embodied as a cable divider, in particular of the type D12.

FIGS. 15a to 15c show a second cable component 106a of the cable components 106a, 110a and a corresponding second component holder 108a of the component holders 108a, 112a. The second cable component 106a is embodied as a cable divider, in particular of the type D23.

In the present case the rear-side cable manager unit 26a is furthermore couplable to the connection module 18a for a mounting and/or demounting of the connection module 18a from the rear, in particular in one of the module receiving regions of the module holder 20a (cf. in particular FIGS. 16a to 18b).

For the purpose of coupling the rear-side cable manager unit 26a with the connection module 18a, the rear side of the connection module 18a is connected to a front side of the rear-side cable manager unit 26a. In this the first coupling elements 104a couple with the first module coupling elements 67a (cf. in particular FIGS. 16b to 16e). In the present case the first coupling elements 104a engage into the first module coupling elements 67a. The first coupling elements 104a and the first module coupling elements 67a are configured at least substantially for orienting the rear-side cable manager unit 26a with respect to the connection module 18a. Furthermore the second coupling elements 102a couple with the second module coupling elements 69a (cf. in particular FIGS. 16b to 16e). In the present case the second coupling elements 102a engage into the second module coupling elements 69a. The second coupling elements 102a and the second module coupling elements 69a are herein configured at least substantially for an in particular fixed connection and/or fixation of the rear-side cable manager unit 26a and the connection module 18a.

Moreover, the second coupling elements 102a are, as has in particular already been mentioned, supported movably. In the present case the second coupling elements 102a are respectively movable in a direction that is perpendicular to a main extension plane of the connection module 18a and/or of the rear-side cable manager unit 26a. The second coupling elements 102a may herein respectively occupy two positions, which are in particular different from each other, in particular a first position and a second position (cf. in particular FIGS. 16d and 16e). In the present case the second coupling elements 102a are movable and/or transferable from the first position into the second position and vice versa by an in particular linear movement of the second base body part 98a relative to the first base body part 96a, in particular in a mounting direction and/or demounting direction, and in particular in a direction that is perpendicular to the movement direction of the second coupling elements 102a. The movement of the second base body part 98a relative to the first base body part 96a herein results in a movement of the guiding elements 124a in the guiding slots 103a. On account of extension directions of the guiding slots 103a respectively including an angle, in this case approximately 30° to 40°, with a movement direction of the second base body part 98a, the movement of the second base body part 98a results in a change of position of the second coupling elements 102a. The relative movement of the base body parts 96a, 98a may herein, in at least one coupling process, be released by a user and/or operator by means of the first handle element 100a and/or of the second handle element 101a.

The first position of the second coupling elements 102a corresponds to a connection position (cf. in particular FIG. 16d). In the first position the rear-side cable manager unit 26a and the connection module 18a can be connected to each other. The second position of the second coupling elements 102a, which is situated more elevated as compared to the first position, in particular if the module wall 57a of the connection module 18a is viewed laterally and/or perpendicularly, corresponds to a holding position (cf. in particular FIG. 16e). In the second position the rear-side cable manager unit 26a and the connection module 18a are fixedly connected to each other. The second position herein corresponds to a mounting and/or demounting position, in which the connection module 18a is mountable in and/or demountable from the module holder 20a by way of a mounting and/or demounting from the rear. Alternatively, it is also conceivable that a rear-side cable manager unit could comprise differently implemented first and/or second coupling elements and/or at least one of the first coupling elements and/or at least one of the second coupling elements might be implemented as a recess. It is also conceivable to entirely dispense with first coupling elements.

Moreover the rear-side cable manager unit 26a comprises a securing unit 119a (cf. in particular FIG. 16O. The securing unit 119a is configured to prevent in at least one operating state a movement of the second base body part 98a relative to the first base body part 96a, in particular at least without an external force load. Herein the securing unit 119a is configured at least in the second position of the second coupling elements 102a to prevent a movement of the second base body part 98a relative to the first base body part 96a, in particular without an external force load, thus in particular at least temporarily securing, in particular holding and/or fixating, the second coupling elements 102a in the second position, in particular holding position, as a result of which in particular a secure connection is achievable between the rear-side cable manager unit 26a and the connection module 18a. Moreover the securing unit 119a is in the present case also configured to prevent in the first position of the second coupling elements 102a a movement of the second base body part 98a relative to the first base body part 96a, in particular at least without an external force load, as a result of which a displacement of the base body parts 96a, 98a relative to each other may advantageously be prevented in an unconnected state as well. Alternatively, however, it is also conceivable to dispense with a securing of second coupling elements in a first position.

For this purpose the securing unit 119a comprises a first securing element 120a. The first securing element 120a is embodied as an in particular self-releasing latch element, in particular latch hook. The first securing element 120a is arranged on the underside of the first base body part 96a. The securing unit 119a further comprises a second securing element 121a. The second securing element 121a is implemented correspondingly to the first securing element 120a. The second securing element 121a is embodied as an in particular self-releasing latch element, in particular latch recess. The second securing element 121a is arranged at the second base body part 98*a*. Furthermore the securing unit 119*a* comprises in the present case a third securing element 122*a*. The third securing element 122*a* is embodied correspondingly to the first securing element 120 a. The third securing element 122*a* is embodied as an in particular self-releasing latch element, in particular latch recess. The third securing element 122*a* is arranged on the second base body part 98*a*. The third securing element 122*a* is embodied at least substantially identical to the second securing element 121*a*.

If the first securing element 120*a* and the third securing element 122*a* are latched with each other, the second coupling elements 102*a* are fixated in the first position. Herein a relative movement between the base body parts 96*a*, 98*a* is prevented, at least without an external force load. Moreover grip recesses of the handle elements 100*a*, 101*a* are in this state arranged offset with respect to each other if viewed perpendicularly to the main extension plane of the connection module 18*a* and/or of the rear-side cable manager unit 26*a* (cf. for example FIG. 17*b*).

The latching of the first securing element 120*a* and the third securing element 122*a* is, however, releasable by a user and/or operator by means of the first handle element 100*a* and/or the second handle element 101*a*, as a result of which the second coupling elements 102*a* are movable into the second position.

If the second coupling elements 102*a* are in the second position, the first securing element 120*a* and the second securing element 121*a* are latched with each other. As a result of this, the second coupling elements 102*a* are fixed in the second position. Herein a relative movement of the base body parts 96*a*, 98*a* is prevented, at least without an external force load. Furthermore the grip recesses of the handle elements 100*a*, 101*a* are in this state congruent with each other if viewed perpendicularly to the main extension plane of the connection module 18*a* and/or of the rear-side cable manager unit 26*a* (cf. for example FIG. 17*a*). In this state the connection module 18*a* can be mounted in the module holder 20 from the rear, in particular in a mounting and/or demounting direction, by means of the rear-side cable manager unit 26*a* and in particular via a linear movement (cf. in particular FIG. 16*a*). In a mounted state the connection module 18*a* is then latched in the module holder 20*a*, in particular between two support walls 74*a*.

As the connection module 18*a* is in the mounted state movable relative to the rear-side cable manager unit 26*a*, the fixed connection between the rear-side cable manager unit 26*a* and the connection module 18*a* has to be released in the mounted state and/or in a mounting process of the connection module 18*a*. Herein in particular the latching of the first securing element 120*a* and the second securing element 121*a*, which has been established by the securing unit 119*a*, must be released and the second coupling elements 102*a* must be moved back into the first position. In the present case a separation of the connection between the rear-side cable manager unit 26*a* and the connection module 18*a* is effected in the mounting process autonomously and/or automatically.

For this purpose the cable manager unit 26*a* comprises at least one unlocking unit 117*a* (cf. in particular FIGS. 17*a* and 17*b*). FIG. 17*a* herein shows a state in which the first securing element 120*a* and the second securing element 121*a* are latched with each other, the second coupling elements 102*a* thus being fixated in the second position. FIG. 17*b* shows a state in which the first securing element 120*a* and the third securing element 122*a* are latched with each other, the second coupling elements 102*a* thus being fixated in the first position. The unlocking unit 117*a* comprises a first unlocking element 116*a*. The first unlocking element 116*a* is implemented as an, in particular spring-elastic, reset element. The first unlocking element 116*a* is embodied at least partially spiral-shaped. The first unlocking element 116*a* is arranged on the underside of the first base body part 96*a*. Moreover the unlocking unit 117*a* comprises a second unlocking element 118*a*. The second unlocking element 118*a* is embodied as a connecting pin. The second unlocking element 118*a* is arranged on the second base body part 98*a*. The second unlocking element 118*a* has an operative connection with the first unlocking element 116*a*. In the present case the second unlocking element 118*a* is directly connected to the first unlocking element 116*a*. The first unlocking element 116*a* is configured to exert a reset force onto the second unlocking element 118*a* in at least one operating state. If the first securing element 120*a* and the third securing element 122*a* are latched with each other, the second coupling elements 102*a* thus being fixated in the first position, the first unlocking element 116*a* is in a relaxed state. In this a reset force exerted onto the second unlocking element 118*a* by the first unlocking element 116*a* is at a minimum.

If the first securing element 120*a* and the second securing element 121*a* are latched with each other, the second coupling elements 102*a* thus being fixated in the second position, the first unlocking element 116*a* is in a tensioned state. In this a reset force exerted onto the second unlocking element 118*a* by the first unlocking element 116*a* has a maximum value. If in this state the connection module 18*a* is now mounted in the module holder 20*a* from the rear by way of the rear-side cable manager unit 26*a* and via an in particular linear movement, in particular in a mounting and/or demounting direction, then the first securing element 120*a* is deflected counter to a securing direction by the holding plate 54*a*. In this deflected state the first securing element 120*a* is guided towards the third securing element 122*a* by means of the reset force of the first unlocking element 116*a* until the first securing element 120*a* latches with the third securing element 122*a*. On account of this the second coupling elements 102*a* move back into the first position, as a result of which the fixed connection between the rear-side cable-manager unit 26*a* and the connection module 18*a* is released. The connection module 18*a* is thus in the mounted state movable relative to the rear-side cable manager unit 26*a*.

FIGS. 18*a* and 18*b* show a relative movement of this kind between the connection module 18*a* and the rear-side cable manager unit 26*a*, in particular in a state in which a plurality of cables 12*a* are fed to the connection module 18*a*. FIG. 18*a* shows the connection module 18*a* in the stowage position and FIG. 18*b* shows the connection module 18*a* in the operative position. The cable overlength receiving region 28*a* is herein configured to maintain a minimum bending radius of the cables 12*a*, in the present case in particular a minimum bending radius of 44 mm.

As has been mentioned above, the connection module 18*a* is in the mounted state held in the respective module receiving region by a latch connection, a support wall 74*a* allocated to the respective module receiving region comprising at least one latch element 76*a* and at least one further latch element 75*a*, which are in particular configured to prevent a movement of the connection module 18*a* (cf. also FIGS. 6*a* and 6*b*).

For demounting the connection module 18*a* from the rear, the connection module 18*a* has to be in the stowage position. Further the latch connection, in particular at least the further latch element 75a needs to be released and the second coupling elements 102a need to be moved into the second position, in particular so as to remove the connection module 18a out of the module holder 20a together with the rear-side cable manager unit 26a. For this purpose the rear-side cable manager unit 26a comprises an unlocking unit. The unlocking unit comprises at least one unbolting element 125a (cf. FIGS. 16b to 16e). In the present case the unlocking unit comprises two unbolting elements 125a. The unbolting elements 125a are at least substantially identical to each other. The unbolting elements 125a are embodied at least substantially bolt-shaped. The unbolting elements 125a are respectively arranged in a proximity of two opposite-situated, directly adjacent support walls 74a. The unbolting elements 125a are arranged in a proximity of the front side of the first base body part 96a and/or of the second base body part 98a. In the present case respectively one of the unbolting elements 125a is connected to respectively one of the second coupling elements 102a in a one-part implementation. The unbolting elements 125a are thus movable, in particular simultaneously and uniformly, with the second coupling elements 102a. The unbolting elements 125a are respectively configured to release the further latch element 75a of a support wall 74a. In a movement of the second coupling elements 102a into the second position, which movement has in particular been initiated by a user and/or operator via the first handle element 100a and/or the second handle element 101a, the unbolting elements 125a press against the further latch element 75a, thus releasing the latch connection between the connection module 18a and the respective support wall 74a at least partially and in particular at least in such a way that the connection module 18a is removable by means of the rear-side cable manager unit 26a.

The connection unit 10a further comprises a plurality of functional units 34a, 36a, 38a, which are embodied different from a connection module 18a, 19a, from a front-side cable manager unit 22a, from a rear-side cable manager unit 26a and from a protective element 24a, and comprises at least one functional unit receiving zone 30a, 32a, in particular for the functional units 34a, 36a, 38a (cf. in particular FIGS. 19a to 20c). In the present case the connection unit 10a comprises a plurality of functional unit receiving zones 30a, 32a. The functional unit receiving zones 30a, 32a are allocated to the connection modules 18a, 19a. The functional unit receiving zones 30a, 32a are configured to receive the functional units 34a, 36a, 38a. In the present case the connection unit 10a comprises at least two substantially different functional unit receiving zones 30a, 32a.

A first functional unit receiving zone 30a of the functional unit receiving zones 30a, 32a is arranged in the front-side region of the connection unit 10a (cf. in particular FIGS. 19a to 19c). The first functional unit receiving zone 30a is configured to receive functional units 34a, 36a that are implemented as display units.

FIG. 19b herein shows a first functional unit 34a of the functional units 34a, 36a, 38a, which is embodied as a display unit. The first functional unit 34a is configured to display at least one signal of the function monitoring unit, which may in particular be mounted in one of the connection modules 18a, 19a. The first functional unit 34a is embodied as an optical waveguide unit and comprises a plurality of optical waveguides. In addition, the first functional unit 34a is usable as a cable manager and/or as a label holder.

FIG. 19c shows a second functional unit 36a of the functional units 34a, 36a, 38a, which is embodied as a display unit. The second functional unit 36a is herein embodied as a lable holder.

A second functional unit receiving zone 32a of the functional unit receiving zones 30a, 32a is arranged in a rear-side region of the connection unit 10a (cf. in particular FIGS. 20a to 20c). The second functional unit receiving zone 32a is configured to receive a functional unit 38a that is embodied as a control unit.

FIG. 20c herein shows a third functional unit 38a of the functional units 34a, 36a, 38a, which is embodied as a control unit. The third functional unit 38a is configured for controlling the function monitoring unit, which may in particular be mounted in one of the connection modules 18a, 19a.

Alternatively it is, however, also conceivable to dispense with additional functional units and/or functional unit receiving zones, and/or to provide further functional units and/or functional unit receiving zones.

In particular for the purpose of ensuring an especially secure fastening of the connection unit 10a on the carrier unit, the patch bay device comprises at least one fastening element 128a, 132a (cf. in particular FIGS. 21a and 21b). In the present case the patch bay device comprises at least two fastening elements 128a, 132a. The fastening elements 128a, 132a are embodied at least substantially identical to each other. The fastening elements 128a, 132a are in the present case made of metal. The fastening elements 128a, 132a are embodied at least substantially rectangular, in particular if viewed perpendicularly to a main extension plane of the fastening elements 128a, 132a. The fastening elements 128a, 132a are embodied at least substantially L-shaped. A long side of the L-shape respectively forms and/or defines a holding region and/or cable guiding region of the fastening elements 128a, 132a. Furthermore a short side of the L-shape respectively defines a carrier fastening section of the fastening elements 128a, 132a. The carrier fastening sections are herein fastenable to the carrier unit in a manner that is already known. The fastening elements 128a, 132a are in the mounted state arranged in the rear-side region of the connection unit 10a. In the mounted state the fastening elements 128a, 132a, in particular the long side of the L-shape, are fastened to the lateral walls 52a of the frame unit 16a. The fastening elements 128a, 132a are configured to support the connection unit 10a in the rear-side region and, in particular, to at least partially transfer a weight force of the connection unit 10a onto the carrier unit. In the present case the fastening elements 128a, 132a are configured to prevent a rearward sagging of the connection unit 10a.

Moreover the fastening elements 128a, 132a are at least partially configured for a cable guidance and/or for receiving at least one cable component, e.g. the afore-mentioned cable components 106a, 110a. For this purpose the fastening elements 128a, 132a comprise at least one cable fastening element 130a and/or at least one in particular square further holding recess 134a, which is in particular standardized and/or normalized, in particular for a connection to one of the component holders 108a, 112a.

The fastening elements 128a, 132a are herein selectable from a group of fastening elements 128a, 132a, depending on an application purpose of the connection modules 18a, 19a, depending on a connection module 18a, 19a used and/or depending on a height of the frame unit 16a. FIGS. 21a and 21b show, to give examples, two different types of fastening elements 128a, 132a. The different types of fastening elements 128a, 132a are herein at least substantially structurally identical. Alternatively it is, however, also conceivable to entirely dispense with fastening elements, in particular with additional fastening elements.

Beyond this each structural element of the patch bay device could be made of any other material than the material disclosed above, e.g. at least partially, at least to a large part and/or entirely of a plastic, a metal and/or a composite material.

In FIGS. 22 to 26 a further exemplary embodiment of the invention is shown. The following descriptions and the drawings are substantially restricted to the differences between the exemplary embodiments, wherein regarding identically designated components, in particular regarding components with the same reference numerals, principally the drawings and/or the description of the other exemplary embodiment of FIGS. 1a to 21b, may be referred to. For distinguishing between the exemplary embodiments the letter a has been added to the reference numerals of the exemplary embodiment in FIGS. 1a to 21b. In the exemplary embodiment of FIGS. 22 to 26 the letter a has been replaced by the letter b.

The further exemplary embodiment of FIGS. 22 to 26 differs from the above exemplary embodiment at least substantially by a height of a connection unit 10b.

In the present case the connection unit 10b has a height of 3*U and/or 133.35 mm.

Lateral walls 52b of a frame unit 16b are herein adapted to the height of the connection unit 10b. Furthermore the frame unit 16b comprises in this case four holding plates 54b, which are in particular arranged one above the other. The holding plates 54b correspond to the holding plate 54a of the above exemplary embodiment.

Moreover connection modules 18b, 19b correspond to the connection modules 18a, 19a of the above exemplary embodiment.

The connection unit 10b further comprises in this case four module holders 20b, which are in particular arranged one above the other. The module holders 20b correspond to the module holder 20a of the above exemplary embodiment.

A protective element 24b is adapted to the height of the connection unit 10b.

Furthermore the connection unit 10b comprises in this case four front-side cable manager units 22b, which are in particular arranged one above the other. The front-side cable manager units 22b correspond to the front-side cable manager unit 22a of the above exemplary embodiment.

Beyond this, the connection unit 10b may comprise a plurality of rear-side cable manager units 26b. The rear-side cable manager units 26b correspond to the rear-side cable manager units 26a of the above exemplary embodiment. The rear-side cable manager units 26b are in the present case, in the mounted state, supported and/or fixed on the holding plates 54b, in particular one above the other.

The connection unit 10b furthermore comprises first functional unit receiving zones 30b, in this case respectively four first functional unit receiving zones 30b, which are in particular arranged one above the other, and comprises second functional unit receiving zones 32b, in this case respectively four second functional unit receiving zones 32b, which are in particular arranged one above the other. The functional unit receiving zones 30b, 32b correspond to the functional unit receiving zones 30a, 32a of the above exemplary embodiment.

The connection unit 10b may further comprise a plurality of functional units 34b, 36b, 38b. The functional units 34b, 36b, 38b correspond to the functional units 34a, 36a, 38a of the above exemplary embodiment. The functional units 34b, 36b, 38b are in the present case, in the mounted state, arranged in the functional unit receiving zones 30b, 32b, in particular one above the other.

FIG. 23 shows a view of the front side of the connection unit 10b in a fully loaded state. Herein the connection unit 10b comprises precisely four module holders 20b. The connection unit 10b is thus configured to receive up to twenty of the connection modules 18b, 19b simultaneously. The connection unit 10b is configured to simultaneously receive up to five of the connection modules 18b, 19b one beside the other and up to four of the connection modules 18b, 19b one above the other. In particular due to the height of the connection modules 18b, 19b being in the present case 0.75*U and one of the connection modules 18b, 19b comprising precisely 18 ports, the connection unit 10b comprises in the present case a connection zone 14b with a height of 3 U and precisely 360 ports, which in particular corresponds to a port density of 120 ports/U. In this case an additional masking cover may hence be dispensed with.

FIGS. 27 to 30 show a construction kit system 42 according to the invention. The construction kit system 42 may herein comprise all structural elements previously mentioned.

The construction kit system 42 comprises a first construction kit 44 for making the frame units 16a, 16b (cf. FIG. 27). The first construction kit 44 comprises a group 136 of cover plates 50a, 50b, a group 138 of lateral walls 52a, 52b and a group 139 of holding plates 54a, 54b. The group 136 of cover plates 50a, 50b comprises in the present case one element. The group 138 of lateral walls 52a, 52b comprises in the present case two elements. The group 139 of holding plates 54a, 54b comprises in the present case one element. Alternatively, each group of the first construction kit could comprise a different number of elements.

The construction kit system 42 comprises a second construction kit 46 for making the connection modules 18a, 19a, 18b, 19b (cf. FIG. 28). The second construction kit 46 comprises a group 140 of module walls 57a, 57b, a group 142 of module covers 58a, 58b, a group 144 of front-side module elements 60a, 61a, 62a, 60b, 61b, 62b and a group 146 of rear-side module elements 64a, 66a, 64b, 66b. The group 140 of module walls 57a, 57b comprises in the present case one element. The group 142 of module covers 58a, 58b comprises in the present case one element. The group 144 of front-side module elements 60a, 61a, 62a, 60b, 61b, 62b comprises in the present case three elements. The group 146 of rear-side module elements 64a, 66a, 64b, 66b comprises in the present case two elements. Alternatively, each group of the second construction kit could comprise a different number of elements.

The construction kit system 42 comprises a third construction kit 48 for making the rear-side cable manager units 26a, 26b (cf. FIG. 29). The third construction kit 48 comprises a group 148 of base body covers 114a, 114b, a group 150 of first base body parts 96a, 96b, a group 152 of second coupling elements 102a, 102b, a group 154 of second base body parts 98a, 98b, a group 156 of cable components 106a, 110a, 106b, 110b and a group 158 of component holders 108a, 112a, 108b, 112b. The group 148 of base body covers 114a, 114b comprises in the present case one element. The group 150 of first base body parts 96a, 96b comprises in the present case one element. The group 152 of second coupling elements 102a, 102b comprises in the present case one element. The group 154 of second base body parts 98a, 98b comprises in the present case one element. The group 156 of cable components 106a, 110a, 106b, 110b comprises in the present case two elements. The group 158 of component holders 108a, 112a, 108b, 112b comprises in the present case two elements. Alternatively, each group of the third construction kit could have a different number of elements.

Alternatively or additionally, it is conceivable that a construction kit system comprises further construction kits, e.g. at least one construction kit to make a module holder, a front-side cable manager unit and/or a protective element.

The invention claim is:

1. A patch bay device, in particular for optical waveguide cables, with at least one connection unit which defines at least one port, wherein the connection unit has in at least one connection zone a port density of at least 0.55 ports/cm$^2$, wherein the at least one connection unit comprises at least one connection module, which provides the at least one port, wherein the at least one connection module has a width of maximally a quarter of the width of the connection unit, and the connection unit comprises at least one frame unit that has a modular structure, due to which the connection unit is extendable and/or reducible in width.

2. The patch bay device according to claim 1, wherein the connection unit is embodied as a 19-inch insert and the connection zone has a port density of at least 110 ports/U.

3. The patch bay device according to claim 1, wherein the connection zone is arranged on a front side of the connection unit.

4. The patch bay device according to claim 1, wherein the connection unit has a modular structure.

5. The patch bay device according to claim 4, wherein the connection unit comprises at least one frame unit that has a modular structure.

6. The patch bay device according to claim 1, wherein the connection unit comprises at least one connection module, which provides the at least one port.

7. The patch bay device according to claim 6, wherein the connection module provides at least nine ports.

8. The patch bay device according to claim 6, wherein the connection module has a height of at least 1.78 cm and/or maximally 3.56 cm.

9. The patch bay device according to claim 6, wherein the connection module is releasable, connectable and/or replaceable individually and independently from further connection modules.

10. The patch bay device at least according to claim 6, wherein the connection module has a modular structure.

11. The patch bay device according to claim 6, wherein the connection unit comprises at least one module holder, which is movable from at least one stowage position into at least one processing position and vice versa, and is configured to receive the connection module.

12. The patch bay device according to claim 11, wherein connection module is at least introducible into the module holder from a rear side for mounting and/or is at least removable out of the module holder from a rear side for demounting.

13. The patch bay device according to claim 11, wherein the connection unit comprises at least one protective element, which is configured in at least one operating state to at least partially cover the connection zone, and is connected to the module holder.

14. The patch bay device according to claim 11, wherein the connection unit comprises at least one front-side cable manager unit, which is configured in at least one operating state to feed at least one cable to the connection zone, and is connected to the module holder.

15. The patch bay device according to claim 6, wherein the connection unit comprises at least one rear-side cable manager unit, which is configured in at least one operating state to feed at least one cable to the connection module.

16. The patch bay device according to claim 15, wherein the rear-side cable manager unit has a modular structure.

17. The patch bay device according to claim 15, wherein the rear-side cable manager unit is couplable to the connection module for mounting and/or demounting of the connection module.

18. The patch bay device according to claim 15, wherein the rear-side cable manager unit defines at least one cable overlength receiving region.

19. The patch bay device according to claim 1, wherein the connection unit comprises at least one functional unit receiving zone, which is allocated to at least one connection module and is configured to receive at least one functional unit that differs from a connection module, from a front-side cable manager unit, from a rear-side cable manager unit and from a protective element.

20. A patch panel with at least one patch bay device according to claim 1.

21. The patch bay device according to claim 15,
wherein the rear-side cable manager unit comprises at least one unlocking unit, wherein the unlocking unit comprises a first unlocking element, and
wherein the first unlocking element is implemented as a spring-elastic, reset element.

22. The patch bay device according to claim 15,
wherein the rear-side cable manager unit comprises a first base body part, wherein the first base body part comprises a first handle element, and
wherein the first handle element is arranged on a rear side of the first base body part.

23. The patch bay device according to claim 15, wherein the rear-side cable manager unit comprises a securing unit, which is configured to prevent in at least one operating state a movement of a second base body part of the rear-side cable manager unit relative to a first base body part of the rear-side cable manager unit, at least without an external force load.

24. A patch bay device, in particular for optical waveguide cables, with at least one connection unit which defines at least one port, wherein the connection unit has in at least one connection zone a port density of at least 0.55 ports/cm$^2$, wherein the connection unit comprises at least one connection module, which provides the at least one port, and the connection unit comprises at least one rear-side cable manager unit, which is configured in at least one operating state to feed at least one cable to the connection module, wherein the rear-side cable manager unit defines at least one cable overlength receiving region, wherein the rear-side cable manager unit comprises at least one cable divider, and wherein the rear-side cable manager unit comprises at least one coupling element with which a plurality of connection modules can be coupled to the rear-side cable manager unit.

25. The patch bay device according to claim 1, wherein the at least one connection unit comprises a plurality of connection modules, which are arranged one beside the other with respect to the width of the connection unit.

* * * * *